(12) United States Patent
Rohloff et al.

(10) Patent No.: US 10,581,812 B2
(45) Date of Patent: Mar. 3, 2020

(54) DEVICE, SYSTEM AND METHOD FOR FAST AND SECURE PROXY RE-ENCRYPTION

(71) Applicant: Duality Technologies, Inc., Maplewood, NJ (US)

(72) Inventors: Kurt Rohloff, West Orange, NJ (US); Vinod Vaikuntanathan, Boston, MA (US)

(73) Assignee: Duality Technologies, Inc., Maplewood, NJ (US)

( * ) Notice: Subject to any disclaimer, the term of this patent is extended or adjusted under 35 U.S.C. 154(b) by 69 days.

(21) Appl. No.: 15/366,850

(22) Filed: Dec. 1, 2016

(65) Prior Publication Data

US 2017/0155628 A1    Jun. 1, 2017

Related U.S. Application Data

(60) Provisional application No. 62/261,526, filed on Dec. 1, 2015.

(51) Int. Cl.
*H04L 29/06* (2006.01)
*H04L 9/08* (2006.01)
*H04L 9/30* (2006.01)

(52) U.S. Cl.
CPC ........ *H04L 63/0464* (2013.01); *H04L 9/0861* (2013.01); *H04L 9/30* (2013.01);
(Continued)

(58) Field of Classification Search
CPC ..... H04L 63/02; H04L 63/06; H04L 63/0464; H04L 63/0471; H04L 63/0478; H04L 9/30; H04L 9/0861; H04L 2221/76
See application file for complete search history.

(56) References Cited

U.S. PATENT DOCUMENTS 8,094,810 B2    1/2012  Hohenberger et al.
9,083,526 B2 *  7/2015  Gentry .................... H04L 9/008
(Continued)

FOREIGN PATENT DOCUMENTS

EP         2629448 A1 *  8/2013
KR    20130024143 A  *  3/2013

OTHER PUBLICATIONS

Brakerski et al, Fully Homomorphic Encryption from Ring-LWE and Security for Key Dependent=Messages, 2011, Springer, Berlin, Heidelberg, vol. 6841, p. 1-4 (Year: 2011).*

(Continued)

*Primary Examiner* — Alexander Lagor
*Assistant Examiner* — William B Jones
(74) *Attorney, Agent, or Firm* — Pearl Cohen Zedek Latzer Baratz LLP

(57) ABSTRACT

A device, system and method for fast and secure Proxy Re-Encryption (PRE) using key switching. A first user is assigned first encryption and decryption keys and a second user is assigned second encryption and decryption keys. First encrypted data encrypted with the first encryption key may be re-encrypted using a proxy re-encryption key to simultaneously switch encryption keys by adding the second encryption key and cancelling the first encryption key by the first decryption key to transform the first encrypted data encrypted by the first encryption key to second encrypted data encrypted by the second encryption key, without decrypting the underlying data. The second user may be the sole system device that possesses the (e.g., private) second decryption key to decrypt the second encrypted data.

16 Claims, 7 Drawing Sheets

(52) U.S. Cl.
CPC .......... *H04L 63/02* (2013.01); *H04L 63/0442* (2013.01); *H04L 63/0471* (2013.01); *H04L 63/0478* (2013.01); *H04L 63/06* (2013.01); *H04L 2209/76* (2013.01)

(56) References Cited

U.S. PATENT DOCUMENTS

| | | | | |
|---|---|---|---|---|
| 2006/0168074 | A1* | 7/2006 | Gardner | H04L 51/12 709/206 |
| 2015/0046985 | A1* | 2/2015 | D'Souza | H04L 63/08 726/4 |
| 2015/0089243 | A1* | 3/2015 | Veugen | G06F 21/72 713/190 |
| 2015/0149427 | A1* | 5/2015 | Kerschbaum | G06F 16/951 707/706 |

OTHER PUBLICATIONS

Bos et al, Post-quantum key exchange for the TLS protocol form the ring learning with errors problem, 2015, IEEE Symposium, vol. 1, all (Year: 2015).*

Nunez, et al., "NTRUReEncrypt: An Efficient Proxy Re-Encryption Scheme Based on NTRU", 10th ACM Symposium on Information, Computer and Communications Security (AsiaCCS), Apr. 2015, pp. 179-189.

Lopez-Alt, et al. "On-the-Fly Multiparty Computation on the Cloud via Multikey Fully Homomorphic Encryption", Proceedings of the Annual ACM Symposium on Theory of Computing, Jan. 2012, pp. 1219-1234.

Polyakov, et al., "Fast Proxy Re-Encryption for Publish/Subscribe Systems", ACM Transactions on Information and System Security, vol. 1, No. 1, Article 1, Jan. 2015, pp. 1-30.

* cited by examiner

DEVICE, SYSTEM AND METHOD FOR FAST AND SECURE PROXY RE-ENCRYPTION

CROSS-REFERENCE TO RELATED APPLICATIONS

This application claims the benefit of prior U.S. Provisional Application Ser. No. 62/261,526, filed Dec. 1, 2015, which is incorporated by reference herein in its entirety.

FIELD OF THE INVENTION

Embodiments of the invention relate to the field of data encryption, decryption and re-encryption, and in particular, to proxy re-encryption.

BACKGROUND OF THE INVENTION

Modern encryption technologies are one of the most effective technological building-blocks for providing confidentiality within information systems. Most modern encryption systems support operations in which data is encrypted in a way where it can be decrypted only by users with a unique decryption key. For symmetric key encryption systems, such as Advanced Encryption Standard (AES), the encryption and decryption keys are the same, and every effort must be made in practice from leaking the keys to adversaries lest the adversaries gain the ability to decrypt and access sensitive data. For public key encryption systems, such as RSA, a paired public key and secret key are used such that data, once encrypted with a public key, can only be decrypted with its corresponding secret key. If an adversary obtains the public key, the adversary could still not decrypt the data.

A limitation of most modern cryptosystems is that once data is encrypted, it is generally impossible to delegate access to a recipient unless the recipient has the original decryption key associated with the encryption key. Access to encrypted data could be used, for example, with publish-subscribe use cases where publishers encrypt data that is published to an information broker server, and subscribers can later access and decrypt the data. In this use case, current cryptosystems require publishers and subscribers to coordinate and share an agreed-upon decryption key before access is granted. Accordingly, there is a need in the art to securely delegate data access to a new recipient, after the data has been encrypted.

SUMMARY OF EMBODIMENTS OF THE INVENTION

According to an embodiment of the invention, a device, system and method is provided to resolve the aforementioned longstanding problems inherent in the art by providing fast and secure Proxy Re-Encryption (PRE), for example, to enable confidential ad-hoc information distribution in low-resource embedded systems. In one embodiment, the device, system and method provide a lattice-based approach to PRE. PRE enables secure distributed ad-hoc information sharing where information producers do not need to receive information consumers' public keys. Because the security of PRE is typically based on the hardness (e.g., order of magnitude of computational effort required to recover the data that is encrypted) of a shortest vector problem, it is post-quantum and resistant even against quantum computing attacks (e.g., not solvable by quantum computing devices within a practical amount of time). In addition, the PRE scheme used according to some embodiments may be secure against Chosen-Plaintext Attacks (CPA) (an attack model for cryptanalysis which presumes that the attacker can obtain the ciphertexts for arbitrary plaintexts). Embodiments of the invention may involve parameter selection tradeoffs. In one example, a C++ implementation of the lattice PRE scheme is designed for scalability and extensibility. As shown experimentally, a PRE device, system and method operated according to embodiments of the invention runs at least an order of magnitude faster than, and is more secure than, prior lattice-based PRE schemes. An application of a PRE operated according to embodiments of the invention is discussed, for example, as it pertains to the case of publisher-subscriber data sharing operations, although the application pertains to any multi-user or multi-entity system.

In accordance with an embodiment of the invention, a device, system and method is provided for proxy re-encryption using key switching. A request may be received for a first user's (publisher's) data to be accessed by a second user (e.g., subscriber). The first user may be assigned a first encryption (e.g., public) key and a corresponding first decryption (e.g., secret) key (e.g., to decrypt data encrypted by the first encryption key) and the second user may be assigned a second encryption (e.g., public) key and a corresponding second decryption (e.g., secret) key (e.g., to decrypt data encrypted by the second encryption key). First encrypted data may be received (e.g., from the first user) comprising the requested data encrypted with a first encryption key. A proxy re-encryption key may be received (e.g., from die first user) generated based on a combination of the first decryption key and the second encryption key. The first encrypted data may be re-encrypted using a proxy re-encryption key to simultaneously switch encryption keys by adding the second encryption key and cancelling the first encryption key (e.g., with the first decryption key) to transform the first encrypted data encrypted by the first encryption key to second encrypted data encrypted only by the second encryption key (or a derivation thereof), without decrypting the request data. The second encrypted data may be sent, to the second user, which may possess the sole copy of the second decryption key in the system to decrypt the requested data.

In accordance with an embodiment of the invention, a device, system and method is provided for multi-layered re-encryption. Once-encrypted data may be received from a first user assigned a first (e.g., public) encryption key and a corresponding first (e.g., private) decryption key, where the once-encrypted data comprises a first layer of encryption by the first encryption key. A multi-layered re-encryption key may be received, e.g., from the first user, generated based on the first decryption key encrypted by a second encryption key assigned to a second user. The once-encrypted data may be re-encrypted using a second encryption (e.g., public) key to generate twice-encrypted data comprising a second layer of encryption to generate data that is encrypted by the first and second encryption keys. The twice-encrypted data may be once-decrypted using the multi-layered re-encryption key to simultaneously cancel the first layer of encryption by the first encryption key with the first decryption key while leaving the second layer of encryption by the second encryption key to generate second encrypted data comprising the data encrypted by only the second encryption key (or a derivation thereof). The second encrypted data may be output, e.g., stored, displayed, or sent to a user requesting the data.

In accordance with an embodiment of the invention, a device, system and method is provided for generating a proxy re-encryption key. A pair of first encryption and decryption keys may be stored that are assigned to the first user in a memory. A second encryption key (nay be received that is assigned to a second user that requested the first user's data. The proxy re-encryption key may be generated based on a combination of the first decryption (e.g., private) key assigned to the first user and the second encryption (e.g., public) key assigned to the second user. First encrypted data may be generated comprising the requested data encrypted by the first encryption key. A proxy server may be sent the proxy re-encryption key and the first encrypted data to re-encrypt the first encrypted data encrypted by the proxy re-encryption key to generate second encrypted data encrypted by only the second encryption key (or a derivation thereof).

These, additional, and/or other aspects and/or advantages of embodiments of the invention are set forth in the detailed description and/or are learnable by practice of embodiments of the invention.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
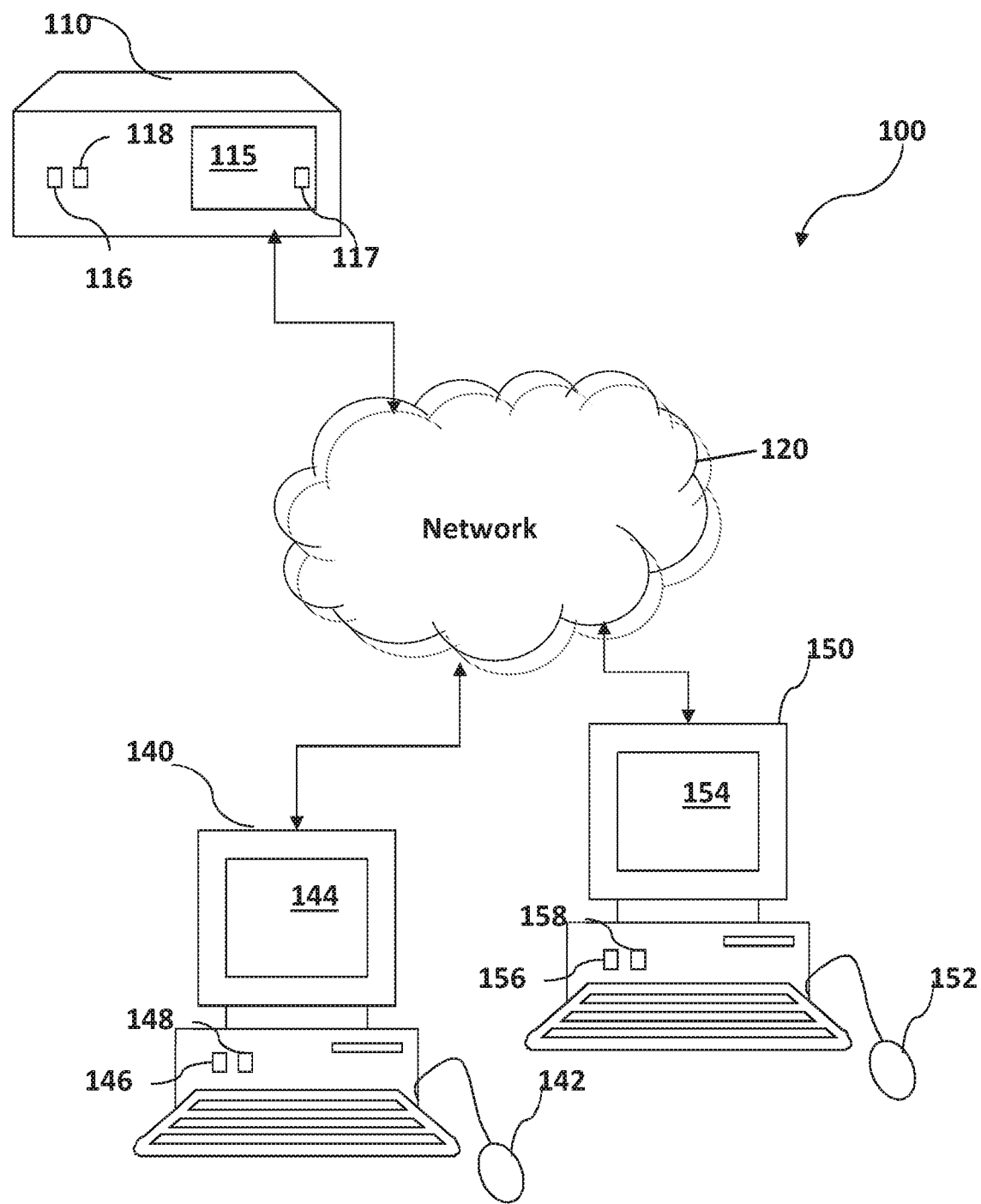
FIG. 1A is a schematic illustration of a system for proxy re-encryption (PRE) in accordance with an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Introduction

A major issue for encryption and information sharing systems is a problem of trust. For example, the sharing of secret keys is unacceptable. Even when sharing public keys, the participants in key exchange need to know they are getting the keys from the correct source. Proxy Re-Encryption (PRE) provides an approach to avoid this limitation of required pre-coordination of publishers and subscribers when sharing information. PRE enables subscribers to receive and decrypt encrypted data that they are intended to receive without ever directly coordinating decryption keys with the publisher of the data. To do this, PRE securely switches the key under which sensitive data is encrypted without full decryption or forbidden access to sensitive data.

The basis of the PRE process is that publishers use public keys to encrypt data. A PRE process uses a special "re-encryption key" that is generated without interaction between publishers and subscribers to convert data encrypted by a publisher into data that can be decrypted by an intended subscriber.

If properly designed, implemented and configured, the confidentiality of information brokered by the PRE server is preserved even if an adversary observes all of the encrypted messages sent to and from the PRE server, the public keys used by the publisher, and the re-encryption keys used by the PRE server. As such, information confidentiality is maintained even if the PRE server and all publishers are captured or compromised, and even if an adversary were to manipulate the PRE server manufacturing process with compromised circuitry. More formally, encrypted ciphertexts are CPA-secure which means they do not reveal even a single bit of the information under computational hardness results. PRE significantly improves broker assurance by keeping sensitive information encrypted by the broker in a way that establishes end-to-end guarantees on the confidentiality of information shared between information producers and consumers.

PRE enables access management for secure publish-subscribe frameworks because:

PRE automates the secure sharing of sensitive data with subscribers that are not fully trusted to receive all data, such as in multi-national, law-enforcement, and other joint operations. Until now, publish-subscribe systems required the decryption (and subsequent encryption) of sensitive data with shared keys to broker that data for the consumption by specific users without leakage to other consumers. PRE only requires the subscriber to share a public key, and a command authority issues that public keys used by the producer and the PRE server.

PRE provides secure ad-hoc data dissemination even with hardware that may be fully compromised. Data brokered by the PRE server (and stored either on disk or in memory) would be encrypted and remain confidential. A compromised PRE server would at most be able to transmit sensitive data to subscribers approved to receive at least some sensitive data.

Embodiments of the invention provide a new Proxy Re-Encryption (PRE) system built using lattice-based encryption. In lattice-based encryption, encryption keys and encrypted data may be represented as polynomials. A lattice may be a set of operations (e.g., rotation, addition, multiplication, etc.) applied to a polynomial. Encryption operations (e.g., multiplications, additions, etc.) may be executed by operating on elements of this lattice, for example, with another polynomial. Lattice encryption may encrypt messages whose security derives from computationally intractable problems on integer lattices. Lattice-based encryption offers some benefits over previous Paillier-based approaches, including that lattice encryption schemes may be post-quantum and are secure against attacks even from adversaries with practical quantum computing devices, in addition to adversaries with classical computing devices. Further, lattice encryption schemes are asymptotically more efficient than other public-key encryption schemes such as Paillier encryption and RSA.

Embodiments of the invention provide an improved lattice-based design that is CPA-secure. In contrast with other PRE systems that require a subscriber to share a secret key for a policy authority to generate a re-encryption key, some embodiments of the invention require only the sharing of a public (not private) key, which is more broadly usable and more secure than sharing both public and private keys.

Evidence is provided showing that the PRE system operated according to some embodiments of the invention runs multiple orders of magnitude faster than the closest previous PRE scheme. A reason for runtime performance improvement is that PRE schemes according to some embodiments of the invention may rely on a bit or base decomposition approach to perform the re-encryption procedure. In a bit or base decomposition approach, a ciphertext is decomposed into vectors with a different dimension for each base power of $2^r$ of the ciphertext modulus (e.g., each bit or higher-order base dimension of the vector i (e.g., power of $2^r$) is defined by the ReEnc operation below). Re-encryption may be performed independently for each dimension of a different power and then may be composed (e.g., summed) back together. This approach to re-encryption is more noise efficient. Noise may be added to the ciphertext to improve security by making it computationally difficult to recover secret keys and plaintext from the ciphertext and new noisy key. By decomposing the ciphertext into multiple bit dimensional portions, significantly less noise is added to achieve the same level of security as used for the entire ciphertext. For example, conventional systems would multiply a ciphertext (e.g., of the form data+noise) by a number N (e.g. N=100) as (e.g., 100×(data+noise)). By decomposing the number into bits (e.g., 100 is decomposed into 1100100) and expanding the ciphertext into dimensional portions (e.g., of powers of 2 or $2^r$) (e.g., data+$noise_0$, 2×data+$noise_1$, 4×data+$noise_2$, . . . ), the same operation according to embodiments of the invention may be represented as (e.g., 0·(data+$noise_0$)+0·(2×data+$noise_1$)+1·(4×data+$noise_2$)). According to this bit decomposition, operations on the noise portion of the ciphertext increase the amount of noise in the ciphertext by at most $Log_2 N$, as compared to the operating number N (e.g., 100) used in conventional operations, resulting in an exponentially decreasing amount of noise according to embodiments of the invention. Greater noise efficiency (less noisy data) allows smaller ciphertext moduli, resulting in smaller ciphertexts and greater space efficiency, relative to conventional schemes of comparable security. The smaller ciphertexts result in more efficient memory usage and in less memory-intensive (i.e., more efficient) operations. When implemented, this results in large runtime performance improvements as compared to other independently developed PRE schemes of comparable security.

In one embodiment, the PRE system is designed, implemented and optimized for an application of supporting and securing distributed publish-subscribe (pub-sub) type interactions and an application to support mobile content distribution. In one embodiment, the PRE system is designed, implemented and optimized for an application of exchanging information between two different governments, companies, or departments therein, each with different security requirements (e.g., transferring classified files from USA to Japan, or from the CIA to the FBI). Other applications may be used.

The PRE system and its implementation according to embodiments of the invention may support an appropriate balance of functionality, security, and scalability for effective mobile ad-hoc information sharing. As such, there is provided the design, development, testing, demonstration and evaluation of a proof-of-concept PRE system with the following capabilities:

A reusable PRE system with multiple publishers and subscribers for secure, high-throughput pub-sub information sharing without requiring private key sharing or other direct interactions between publishers and subscribers.

Testing, demonstration and evaluation of PRE in both laboratory and simulated tactical environments to show the security, scalability, and performance of PRE.

Reference is made to FIG. 1A, which schematically illustrates a system 100 for implementing proxy re-encryption (PRE) in accordance with an embodiment of the invention. System 100 may include a proxy re-encryption (PRE) server 110, an associated database 115, a first user computer 140, such as a publisher computer, and a second user computer 150, such as a subscriber computer, all of which are connected via a network 120.

PRE server 110 may include a computing device for re-encrypted data according to embodiments disclosed herein. Server 110 may include applications for interacting with user computers 140 and 150 and securely storing public keys associated with the users.

Database 115 may include software processes or applications for storing and retrieving data 117 such as public, private and re-encryption keys, and/or data to be encrypted, decrypted or re-encrypted. Data 117 may also include code (e.g., software code), logic, or circuits, e.g., to enable the application of encryption, decryption or re-encryption keys or data according to embodiments of the invention. Database 115 may be internal or external to server 110 and may be connected thereto by a local or remote and a wired or wireless connection. In alternate embodiments, data 117 may be stored in an alternate location separate from database 115, e.g., memory unit(s) 118.

One or more user computer(s) 140 and 150, e.g., controlled by a publisher and a subscriber, respectively, may connect to PRE server 110 via network 120. PRE server 110 may include applications for retrieving encrypted data published by user computer 140, re-encrypting the data, and transferring the re-encrypted data to one or more subscriber computer(s) 150.

User computers 140 and 150 may be servers, personal computers, desktop computers, mobile computers, laptop computers, and notebook computers or any other suitable device such as a cellular telephone, personal digital assistant (PDA), video game console, etc., and may include wired or wireless connections or modems, or users operating such devices. User computers 140 and 150 may include one or more input devices 142 and 152, respectively, for receiving input from a user (e.g., via a pointing device, click-wheel or mouse, keys, touch screen, recorder/microphone, other input components). User computers 140 and 150 may include one or more output devices 144 and 154, respectively, (e.g., a monitor or screen) for displaying data to a user provided by or for PRE server 110.

Network 120, which connects PRE server 110 and user computers 140 and 150, may be any public or private network such as the Internet. Access to network 120 may be through wire line, terrestrial wireless, satellite or other systems well known in the art.

PRE server 110, user computer 140, and user computer 150, may include one or more controller(s) or processor(s) 116, 146, and 156, respectively, for executing operations according to embodiments of the invention and one or more memory unit(s) 118, 148, and 158, respectively, for storing data (e.g., keys and data to be encrypted, decrypted or re-encrypted) and/or instructions (e.g., software for applying keys to encrypt, decrypt or re-encrypt data according to embodiments of the invention) executable by the processor(s). Processor(s) 116, 146, and/or 156 may include, for example, a central processing unit (CPU), a digital signal processor (DSP), a microprocessor, a controller, a chip, a microchip, an integrated circuit (IC), or any other suitable multi-purpose or specific processor or controller. Memory unit(s) 118, 148, and/or 158 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units.

Embodiments of the invention are described in the following section:

"Introduction" section above provides an introduction and overview of a PRE cryptosystem according to embodiments of the invention.

"Proxy Re-Encryption" section provides a high-level description of the concept, performance and security tradeoffs of PRE.

"PRE Cryptosystem Based on LTV Scheme" section describes a lattice-based PRE cryptosystem based on a Lopez-Tromer-Vaikuntanathan (LTV) process.

"PRE Cryptosystem Based on BGV Scheme" section describes a lattice-based PRE cryptosystem based on a Brakerski-Gentry-Vaikuntanathan (BGV) process.

"Parameter Selection for LTV and BGV PRE" section describes parameter selection for a NTRU-based (N-th degree truncated polynomial ring) cryptosystem, for example, to provide practical secure computing on computing hardware.

"Software Implementation" section describes an overall software architecture of a library used to support an end-to-end encryption application.

"Experimental Evaluation" section describes experimentation and evaluation of the PRE cryptosystem design and implementation.

"Application" section describes a proof-of-concept application and experimental results for a secure mobile information brokering application in which information publishers and subscribers are unable to, or are not required to, directly interact or share encryption keys.

"Design Considerations" section describes design considerations relevant in implementing encrypted computing and PRE.

"Discussion and Ongoing Activities" section describes insights and additional or alternative embodiments.

"Flowchart" section describes one or more processes for proxy re-encryption (PRE) in accordance with some embodiments of the invention.

Proxy Re-Encryption

Figure 1B:
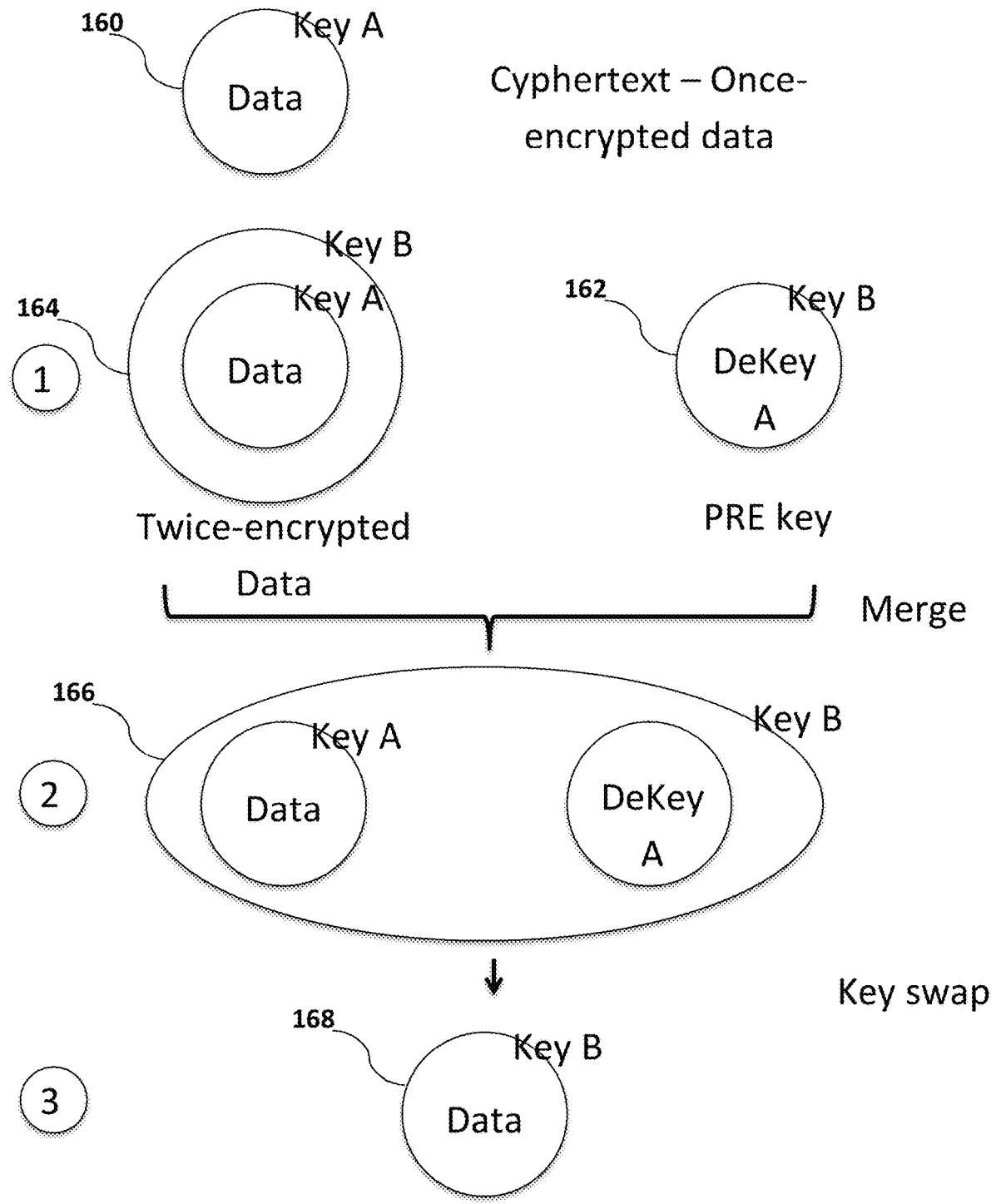
FIG. 1B is a schematic illustration of data structures used for proxy re-encryption (PRE) in accordance with an embodiment of the invention.

Reference is made to FIG. 1B, which is schematically illustrates data structures used for proxy re-encryption (PRE), in accordance with an embodiment of the invention. Proxy re-encryption is a multi-layered encryption scheme using a proxy re-encryption key to switch or swap encryption (e.g., public) keys, without decrypting or exposing the underlying data. Proxy re-encryption may switch encryption keys, for example, from a first encryption key A assigned to a first user A to a second encryption key B assigned to a second user B. The first encryption key A may be decrypted only by a first decryption DeKey A and the second encryption key B may be decrypted only by a second decryption DeKey B. Encryption keys are public keys and decryption keys are private keys. Only a user may obtain the private decryption key assigned to that user.

A second user B may request access to a first user A's data.

The first user A (e.g., a first user computer 140 of FIG. 1A) may encrypt the requested original (unencrypted) input data using a first (e.g., public) encryption key A to generate first encrypted data 160.

The first user A obtains a second (e.g., public) encryption key B from the second user B.

The first user A may generate a re-encryption key 162 as a combination of the second (e.g., public) encryption key B and the first (e.g., private) decryption DeKey A (or functions thereof). In one embodiment, the proxy re-encryption key 162 is the first decryption DeKey A encrypted by the second encryption key B One or more processors (e.g., 116 of proxy server 110 of FIG. 1A) may re-encrypt first encrypted data 160 to switch (e.g., public) encryption keys from first key encryption A (in first encrypted data 160) to second encryption key B (in second encrypted data 168). To achieve this key swap from A to B, re-encryption may include some or all of the following steps performed simultaneously or sequentially:

(1) Add the second (e.g., public) encryption key B to encrypt the first encrypted data 160 to generate twice-encrypted data 164 and receive the re-encryption key 162 from the first user.

(2) Merge the proxy re-encryption key 162 and twice-encrypted data 164 as a combined data structure 166 of first encrypted data and first decryption key A, collectively encrypted under a common encryption layer by the same second encryption key B.

(3) Under the common encryption layer of the second encryption key B in combined data structure 166, cancel the first encryption key A by decrypting the first encrypted data using the first decryption DeKey A, to generate second encrypted data 168 that is encrypted only by the second encryption key B.

All data structures 160-168 involved in all steps of proxy re-encryption are encrypted by one or more keys (e.g., key A, DeKey A, key B, DeKey B, or a combination of keys or DeKeys A and B) so that the underlying data is never completely unencrypted or exposed during the proxy re-encryption process. If a malicious party obtains the proxy re-encryption key, there is no direct threat, because the proxy re-encryption key cannot unencrypt the initial data.

After re-encryption, the proxy server may send second encrypted data 168 to the second user (e.g., a second user computer 150 of FIG. 1A). The first user may be the sole device in the system that possesses the first (e.g., private) decryption key A, and thus may be the sole device that can decrypt the first encrypted data 160. The second user may be the sole device in the system that possesses the second (e.g., private) decryption key B, and thus may be the sole device that can decrypt the second encrypted data 168. The proxy server possessing public keys A and B and the PRE key cannot decrypt either the first encrypted data 160 or the second encrypted data 168.

Figure 2A:
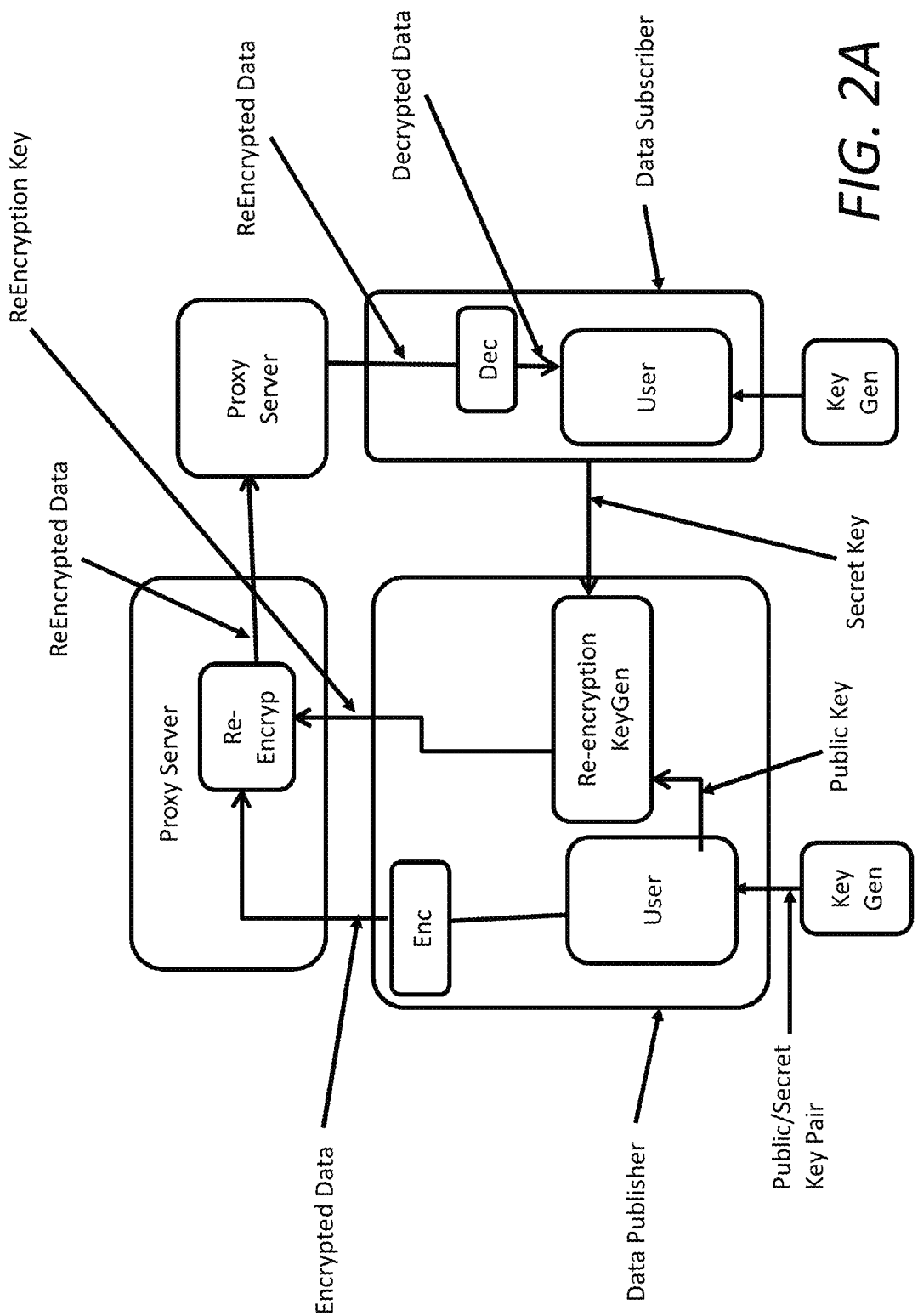
FIGS. 2A and 2B are schematic illustrations of PRE cryptosystems, e.g., the system of FIG. 1A, in accordance with an embodiment of the invention.
Figure 2B:
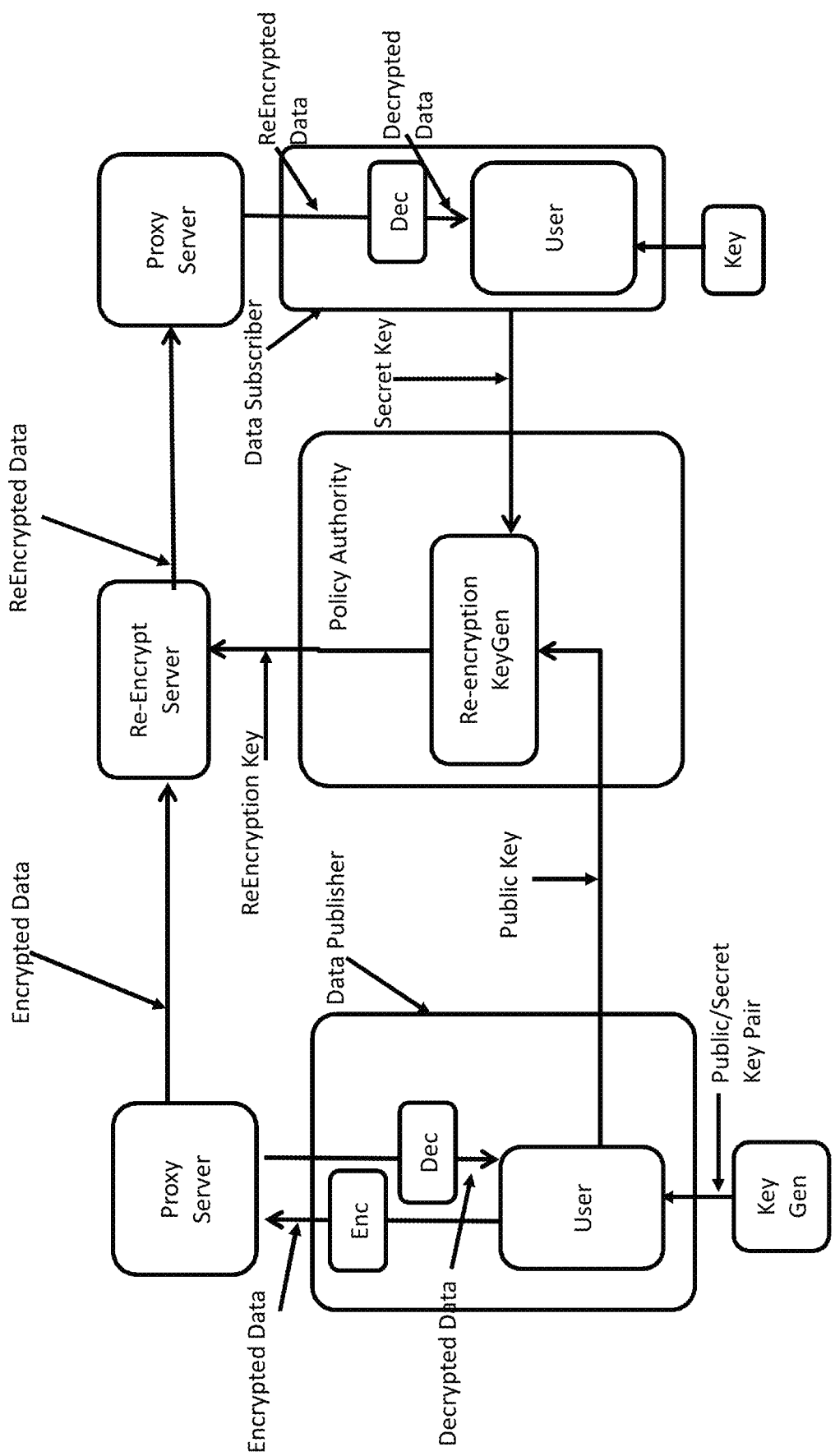

Reference is made to FIGS. 2A and 2B, which schematically illustrates a PRE cryptosystem according to an embodiment of the invention. In FIGS. 2A and 2B:

1. A first user, e.g., a data publisher, encrypts source data (e.g., using a first user computer 140 of FIG. 1A) with its assigned first (e.g., public) encryption key to generate first encrypted data.
2. A proxy server (e.g., server 110 of FIG. 1A) re-encrypts the encrypted data ("ciphertext") with a re-encryption key to generate second encrypted data encrypted by a second (e.g., secret) encryption key assigned to a second user, so that information from the first user can be shared with a second user.
3. A second user, e.g., a data subscriber, is then able to decrypt the re-encrypted ciphertext (e.g., using a second user computer 150 of FIG. 1A) with its assigned second (e.g., secret) decryption key to unencrypt the source data.

Only the second user can decrypt the second encrypted data to obtain the original unencrypted source data. Other recipients cannot decrypt the second encrypted data (to do so requires the second user's secret decryption key held only by the second user) and possession of the re-encryption key does not provide access to the unencrypted data.

Each subscriber may generate their own public/secret key pair. A re-encryption policy authority (also called a policy manager) may generate and store the public and secret keys for each publisher. The re-encryption key(s) may be generated and/or assigned to the proxy server by the first user (see FIG. 2A), the policy authority (see FIG. 2B), or may be generated by the proxy server itself. The re-encryption key(s) may be distributed to the PRE-enabled proxy servers that perform the re-encryption. In general, each device may generate its own public/secret key pair or may be assigned such keys by the first user/publisher, the policy authority, or proxy server. In the embodiment shown in reference to FIG. 2B, the policy authority maintains strong control over who can share information through the proxy server without requiring the publishers or subscribers to use multiple keys. However, the policy authority need only distribute a single re-encryption key (or more if desired, e.g., according to periodic or event-triggered updates) for each publisher-subscriber or other user pair. Once the policy authority distributes the re-encryption key to the proxy server, the policy authority need no longer operate and support every re-encryption operation as it happens. The concept is that the policy manager interacts with the proxy server infrequently, for example, possibly over a low-bandwidth channel, to transfer a re-encryption key for a particular publisher-subscriber or other user pair, after which the proxy server can maintain the transfer of secure re-encrypted data between that publisher-subscriber or other user pair.

An important feature of PRE is that it makes distributed key management simpler. However, keys still need to be generated, distributed and manipulated. FIGS. 2A and 2B are schematic illustrations of PRE key management infrastructure interactions in accordance with embodiments of the invention.

FIG. 2A shows a high-level operational flow for a key management infrastructure as follows:

1. The first (e.g., publishing) user generates public and secret key pairs for the data publisher. These keys are designated as $pk_p$ and $sk_p$ respectively. This key generation operation nominally occurs prior to deployment, or just as publishers need to send information to a proxy server.
2. When a second user (e.g., data subscriber) is to receive information from the proxy server, the data subscriber sends his public key ($pk_s$) to the data publisher. This could occur prior to deployment or just as a subscriber needs to interact in a tactical operation.
4. The data publisher uses the publisher secret key ($sk_p$) and the subscriber public key ($pk_s$) to generate a re-encryption key ($rk_{ps}$). This could occur prior to deployment or just as a data subscriber needs to interact in a tactical operation.
5. The publisher sends the re-encryption key used to securely share information from the publisher to the subscriber ($rk_{ps}$) to the proxy server.

FIG. 2B shows a high-level operational flow for a key management infrastructure using a policy authority as follows:

1. The policy authority generates public and secret key pairs for the first user (e.g., data publisher). These keys are designated as $pk_p$ and $sk_p$ respectively. This key generation operation nominally occurs prior to deployment, or just as publishers send information to a proxy server.
2. Prior to deployment, the policy authority sends the publisher public key $pk_p$ to the publisher. The publisher (and possibly multiple publishers) uses this public key to encrypt information they send to the proxy server. The policy authority retains the secret key $sk_p$ in case it needs to access information encrypted by the publisher. This publisher key sharing operation nominally occurs prior to deployment, or just as publishers need to send information to a proxy server.
3. When a second user (e.g., subscriber) requests information from the proxy server, the subscriber sends the subscriber's public key ($pk_s$) to the policy authority. This could occur prior to deployment or just as a subscriber initiates an interaction in a tactical operation.
4. The policy authority uses the publisher secret key ($sk_p$) and the subscriber public key ($pk_s$) to generate a re-encryption key ($rk_{ps}$). This could occur prior to deployment or just as a subscriber initiates an interact in a tactical operation.
5. The policy authority sends the re-encryption key used to securely share information from the publisher to the subscriber ($rk_{ps}$) to the proxy server.

An important aspect of the key management infrastructure in FIG. 2B is that the implementation pushes trust and computational effort from the publisher to the policy authority and proxy server. The policy authority determines which users can share information and the proxy server uses (e.g., pub-sub) data access or security policies to determine what subset of information from the publisher is permitted to be sent to the subscriber. The publisher and subscriber end-users, who generally have the lowest computational capability in tactical information sharing operations, require the lowest computational effort and only need to maintain a single key. Delegating computational effort to the server-side policy authority and/or proxy server with generally greater computational capabilities relative to the end-users may increase overall system speed by distributing relatively complex encryption tasks to devices with relatively higher computational capacities.

Another important security aspect of the PRE system is that it pushes primary key management operations outside of the mobile environment. Once the policy authority shares the publisher public key and the re-encryption key, the policy authority does not need to participate in tactical operations. The key management aspect of the policy authority could be taken completely offline, thus minimizing adversarial threats to secret keys stored at the policy authority during tactical operations.

PRE Cryptosystem Based on LTV Scheme

The first PRE scheme proposed in this paper is based on a NTRU encryption scheme with Ring-LWE modifications, which is also referred to as the Lopez-Tromer-Vaikuntanathan (LTV) scheme. LTV encryption is mentioned only as an example and not by way of limitation. Other encryption schemes may be used.

LTV Encryption Scheme

Data (m) is parameterized, for example, using the following quantities:
  security parameter (e.g., root Hermite factor) $\delta$,
  prime ciphertext modulus $q=q(\delta)$,
  ring dimension $n=n(\delta)$,
  cyclotomic polynomial $\Phi_m(x)$ where $n=\phi(m)$ (e.g., Euler's totient function, counting the positive integers less than or equal to m that are relatively prime to m),
  B ($\delta$), for example, bounded discrete Gaussian (error) distribution $\chi=\chi(\delta)$ over the polynomial ring $R=Z[n]/<x^n+1>$ For security and implementation reasons, some embodiments of the invention relate to a scenario in which m is a power of 2, i.e., $m=2n$ and $\Phi_m(x)=x^n+1$ (however, m may be any other number). Power-of-2 cyclotomic polynomials are also considered. The plaintext space may be $M=\{0,1\}$ and all operations on ciphertexts may be performed in the ring $R_q = R/qR$. Each coefficient in the polynomials may be represented in the range $$\left\{-\left\lfloor\frac{q}{2}\right\rfloor, \ldots, \left\lfloor\frac{q}{2}\right\rfloor\right\}.$$

The scheme may include the following example operations:
  KeyGen: Sample polynomials $f',g \leftarrow \chi$ and set $f:=2f'\equiv 1$ to satisfy $f \equiv 1 \pmod{2}$. If f has no modular multiplicative inverse in $R_q$, then resample f'. Set the public key pk and private key pk:

$sk:=f \in R$.

$pk:=h=2gf^{-1} \in R_q$,

Enc(pk=h, m): Sample polynomials $s,e \leftarrow \chi$. Compute the ciphertext:

$c:=hs+2e+m \in R_q$.

Dec(sk=f, c): Compute the ciphertext error $b:=f \cdot c \in R_q$. Output $m':=b \pmod 2$.

The scheme is correct as long as there is no wrap-around modulo q. Indeed, $b=f \cdot c=f(h\ s+2e+m)=2gs+2fe+fm$ and $b \pmod 2 = 2gs+2fe+fm \pmod 2 = fm \pmod 2 = m \pmod 2$ if the value of b does not wrap around modulo q.

To derive the correctness constraint for decryption, the coefficients in g, s, and e cannot exceed B as they are generated by a B-bounded discrete Gaussian distribution $\chi$. Analogously, the coefficients in f cannot exceed 2B+1, yielding:

$b=2gs+2fe+fm \leq n(2B+1)+2nB^2 < 8nB^2$

To guarantee correct decryption of the ciphertext, b should not exceed q/2 leading to the following correctness constraint:

$q>16nB^2$.

When $\sigma>\omega(\log n)$, the bound B can be expressed as $\sigma\sqrt{n}$, where $2^{-n+1}$ is the probability that a coefficient generated using discrete Gaussian distribution exceeds the bound B. To obtain less conservative estimated bounds for noise error, an assurance measure $\alpha<n$ may be used corresponding to the probability of $2^{-\alpha+1}$ that a coefficient of a discrete Gaussian polynomial exceeds the bound B (the choice of a specific practical value of a is validated using an empirical analysis of decryption correctness for a large sample of plaintexts).

The above constraint was derived for the worst-case case when both B-bounded polynomials may simultaneously take the upper (or lower) bound values for all coefficients in the polynomials of dimension n. As the coefficients of polynomials generated by discrete Gaussian distribution are taken from a relatively large sample of size n (where n is at least 512), the Central Limit Theorem may be applied to derive a lower (average-case) bound for q.

For a product of two B-bounded polynomials g and s in the ring $R_q$, each coefficient in g may be multiplied by the mean of coefficients in s (e.g., followed by modulo reduction). This implies that each coefficient in g·s is bounded by $n \cdot B \cdot \sigma_n \sqrt{\alpha}$, where $\sigma_n$ is the standard deviation of the mean expressed as:

$$\sigma_n = \frac{\sigma}{\sqrt{n}}.$$

After simplification, the bound for g·s can be expressed as $B^2 \sqrt{n}$ instead of the original worst-case bound $B^2 n$. This technique allows one to replace each term n (e.g., corresponding to a polynomial multiplication) with, for example, $\sqrt{n}$. Applying this logic to the worst-case constraint for the encryption scheme, the following average-case correctness constraint is, for example:

$q>16\sqrt{n}B^2$.

The effective probability associated with assurance measure $\alpha$, e.g., $2^{-\alpha+1}$, may be significantly reduced when a product of two discrete Gaussians is considered. This further justifies the use of an assurance measure significantly smaller than n.

LTV Encryption Scheme: Security

The security of the encryption scheme is based, for example, on the "Ring Learning With Errors" (RLWE) and Decisional Small Polynomial Ratio (DSPR) assumptions.

The DSPR problem is used to distinguish between the following two distributions: a polynomial f/g with f and g sampled from distribution $\chi$ (assuming f is invertible over $R_q$) and a polynomial h sampled uniformly at random over $R_q$. The hardness of this problem for the case of $\Phi_m(x)=x^n+1$ was shown for unbounded adversaries when $\sigma > \sqrt{q}$ poly(n). Once the hardness of DSPR is proven (e.g., the public key cannot be distinguished from a uniformly distributed random polynomial), the RLWE assumption is used to prove the semantic security of encryption.

A general constraint of $\sigma > \sqrt{q}$ poly(n) may be impractical and can be replaced by a much smaller value for a specific choice of parameters. Assuming $\Phi_m(x)=x^n+1$, $q=2^{n^\varepsilon}$ with $\varepsilon \in C$ (0,1), and $\sigma=$poly(n), the encryption scheme is generally secure under the DSPR assumption and the worst-case hardness of approximating shortest vectors on ideal lattices is within a factor of $2^{\Omega(n^\varepsilon)}$, which is believed to be hard (e.g., a computation that cannot be solvable in a practical amount of time, such as, within years, using an economical or feasible amount of computational effort, such as, by a multi-core computer). This result allows us to use the security inequality derived for Ring-LWE:

$$n \geq \frac{\log(q/\sigma)}{4\log(\delta)}.$$

Single Re-Encryption Scheme Based on LTV (LTV-sPRE)

The PRE scheme may be devised using key switching. Consider an original key pair, a private key f and a public key $h=2gf^1$ a new set of keys: private key f* and public key $h^*=2g^*$; $(f^*)^{-1}$. A PRE key may be generated that re-encrypts a ciphertext c using the public key h* without decrypting the data.

To this end, a set of elements $\gamma_i$ may be introduced, for example, as:

$$\gamma_i = h^* s_i + 2e_i + f \cdot (2^r)^i \in R_q,$$

where $i=0,1,\ldots,\lfloor \log q/r \rfloor$ and r is referred to as a "key switching window". A key switching window r may represent the size or granularity of the base decomposition (e.g., bit decomposition for r=2). The set of elements $\gamma_i$, referred to as an evaluation key, represents an encryption of all powers-of-$2^r$ multiples of the secret or private key f under the public key h*. The key switching window may, for example, be set to unity for a binary decomposition of base 2. For example, a range of key switching window values (e.g., powers of 2) has been evaluated to achieve a faster implementation of re-encryption. Adjusting the key switching window allows computers to use memory more efficiently, based on the system it is deployed in, and better leverage parallel execution. For example, increasing r typically compresses data size, thereby decreasing memory usage and increasing computational speeds. Taken together, this leads to improved runtime performance. The vector $\gamma=(\gamma_0,\gamma_1,\ldots,\gamma_{\lfloor \log(q)/r \rfloor})$ may be public.

The ciphertext c may be computed using the public key h, e.g.:

$$c := hs+2e+m \in R_q.$$

For each window i of length r (in bits), the following example parameter is introduced:

$$c_i := \{hs+2e+m\}_i$$

and the ciphertext c may then be represented, e.g., as:

$$c = \sum_i c_i \cdot (2^r)^i.$$

The polynomial c' may be computed as:

$$c' = \sum_i c_i \cdot \gamma_i$$

which can be shown to represent an encryption of m under the new public key h*.

Indeed, $$f^* \cdot c' = f^* \cdot \left(\sum_i c_i \cdot \gamma_i\right) =$$

$$\sum_i c_i \cdot (f^* \cdot \gamma_i) = 2\sum_i c_i \cdot E_i + \sum_i c_i f^* f \cdot (2^r)^i = 2\sum_i c_i \cdot E_i + f^* fc,$$

where $$E_i = g^* s_i + f^* e_i.$$

It is can be seen that:

$$f^* \cdot c' = f^* f c = m \pmod 2,$$

i.e., the decryption is correct, if the ciphertext error $f^* \cdot c'$ is not too large to wrap around q.

Considering that $$|c_i|_\infty \leq 2^r - 1, \; |E_i|_\infty \leq nB^2 + nB(2B+1), \text{ and}$$

$$|f^* fc|_\infty \leq n^2(2B+1)\{(2B+1)^2 + 2B^2\},$$

we have $$|f^* c'|_\infty \leq 2n(\lfloor \log(q)/r \rfloor + 1)(2^r - 1)\{nB^2 + nB(2B+1)\} +$$

$$n^2(2B+1)\{(2B+1)^2 + 2B^2\} < 8(2^r - 1)n^2B^2(\lfloor \log(q)/r \rfloor + 1) + 16n^2B^3.$$

To guarantee correct decryption of the ciphertext, $f^* \cdot c'$ should not exceed q/2 leading to the following worst-case correctness constraint:

$$q > 16(2^r-1)n^2B^2(\lfloor \log(q)/r \rfloor+1)+32n^2B^3.$$

Similar to the case of the encryption scheme, the Central Limit Theorem may be applied to obtain the following example average-case correctness constraint for the PRE scheme:

$$q > 16(2^r-1)nB^2(\lfloor \log(q)/r \rfloor+1)+32nB^3.$$

In summary, the PRE scheme introduces two new operations (in addition to KeyGen (key generation), Enc (encryption), and Dec (decryption)):

ProxyKeyGen (pk=h*,sk=f): For every i=0,1, ..., $\lfloor \log(q)/r \rfloor$, sample polynomials $s_i$ and $e_i$ and compute the proxy re-encryption key for each i (e.g., power of 2, or more generally, power of $2^r$), for example:

$$\gamma_i = h^* s_i + 2e_i + f \cdot (2^r)^i \in R_q,$$

and set, for example:

$$ek := \gamma = (\gamma_0, \gamma_1, \ldots, \gamma_{\lfloor \log(q)/r \rfloor}).$$

ReEnc (ek=$\gamma$,c): Compute the ciphertext, for example, as:

$$c' = \sum_{i=0}^{\lfloor \log(q)/r \rfloor} (c_i \cdot \gamma_i), = h * \sum_i c_i \cdot s_i + 2\sum_i c_i \cdot e_i + f \cdot c =$$

$$h * \sum_i c_i \cdot s_i + 2\sum_i c_i \cdot e_i + 2g \cdot s + 2e \cdot f + f \cdot m =$$

$$h * \sum_i c_i \cdot s_i + 2\sum_i c_i \cdot e_i + 2g \cdot s + 2e \cdot f + (2f' + 1) \cdot m =$$

$$h * \sum_i c_i \cdot s_i + 2\{\sum_i c_i \cdot e_i + g \cdot s + e \cdot f + f' \cdot m\} + 1 \cdot m =$$

$$h * \alpha + 2\beta + m$$

where $$c_i := \{h \cdot s + 2e + m\}_i$$

and $$c = \sum_{i=0}^{\lfloor \log(q)/r \rfloor} c_i \cdot (2^r)^i. \text{ (original ciphertext)}.$$

The ciphertext c is re-encrypted using the ReEnc computation by applying the PRE key $\gamma_i$ composed of the first user's (e.g., publisher's) secret key f and the second user's (e.g., subscriber's) public key h*. As shown in the ReEnc computation above, the second user's public key h* adds and the first user's secret key f cancels to form a re-encrypted ciphertext c' (e.g., c'=h*$\alpha$+2$\beta$+m) that is composed of the original message (m) and noise (2$\beta$) encrypted with the new second user's public key (h*$\alpha$) (e.g., and not encrypted with the first user's secret key f).

According to some embodiment, this re-encryption is performed base-wise, individually for each dimension i of a different base power (e.g., of $2^r$) and then composed (e.g., summed) back together. The base-wise execution of each power of the ciphertext requires less noise than re-encrypting over the entire ciphertext together for the same level of security and is therefore more storage and computationally efficient. Alternatively, PRE may be performed over the entire ciphertext (without bit decomposition).

The PRE scheme may be unidirectional as the evaluation key cannot be used to recover the private key f due to the hardness of the Ring-LWE problem. Collusion is typically not possible in this case as the private key f* is not included in the evaluation key.

Multiple Re-Encryption Scheme Based on LTV (LTV-mPRE)

The proposed re-encryption scheme can support multiple re-encryptions. Consider a new set of keys: private key f and public key h=2g(f)$^{-1}$. The goal is to re-encrypt the re-encrypted ciphertext c' devised above using the public key h** without decrypting the data.

Analogously to the case of single re-encryption, a set of the following bit decomposition of proxy re-encryption key elements may be, for example:

$$\gamma'_i = h^{} s'_i + 2e'_i + f^{} \cdot (2^r)^i \in R_q,$$

where i=0,1, ..., $\lfloor \log(q)/r \rfloor$. The vector $\gamma' = (\gamma'_0, \gamma'_1, \ldots, \gamma'_{\lfloor \log(q)/r \rfloor})$ may be the evaluation key to switch from $\{f^*, h^*\}$ to $\{f^{}, h^{}\}$.

The twice-re-encrypted ciphertext e may be computed, for example, as:

$$c'' = \sum_i c'_i \cdot \gamma'_i$$

which can be shown to represent an encryption of data (m) under the new public key h** as long as there is no wrap-around modulo q.

Indeed, $$f^{} \cdot c'' = \sum_i c'_i \cdot (f^{} \cdot \gamma'_i) = 2\sum_i c'_i \cdot E'_i + \sum_i c'_i f^{**} f^* \cdot (2^r)^i = 2\sum_i c'_i \cdot E'_i + f^{**} f^* c',$$

where $E_i'$ may represent noise based on the following expression.

$$E'_i = g^{} s'_i + f^{} e'_i.$$

It can be shown that $$f^{} \cdot c'' = f^{} f^* \cdot c' = f^{**} f^* f \cdot c = m \pmod 2,$$

e.g., the decryption is correct, if the ciphertext error f**·c'' is not too large to wrap around q.

Applying the same procedure as for the first re-encryption, the correctness inequality after two re-encryptions can be expressed as:

$$q > 32(2^r - 1)nB^2(\lfloor \log(q)/r \rfloor + 1) + 2n^{0.5}B\{32(2^r - 1)nB^2(\lfloor \log(q)/r \rfloor + 1) + 64nB^3\}.$$

Considering that the first summand is at least by a factor of $2n^{0.5}B$ (this value is larger than $2^8$ for all practical parameter ranges) smaller than the second summand and by rounding up to the next power of two of an upper bound coefficient at a previous step, the correctness constraint can be rewritten, for example, as:

$$q > 2n^{0.5}B\{16(2^r - 1)nB^2(\lfloor \log(q)/r \rfloor + 1) + 32nB^3\},$$

which implies that the second re-encryption increases the lower bound for q by a factor of $2n^{0.5}B$.

This logic can be further applied to derive the correctness inequality after any number of multiple (t) re-encryptions (e.g., t=2, 10, 100, ...):

$$q > (2n^{0.5}B)^{t-1} \cdot \{16(2^r - 1)nB^2(\lfloor \log(q)/r \rfloor + 1) + 32nB^3\}.$$

It should be noted that the effective value of assurance measure $\alpha$ in the expression $B = \sigma\sqrt{\alpha}$, corresponding to a given probability can be further decreased for each extra step of re-encryption as long as the empirical evaluation of decryption correctness is performed.

PRE Cryptosystem Based on BGV Scheme

The second PRE process proposed in this paper is based on a BGV scheme. BGV encryption is mentioned only as an example and not by way of limitation. Other encryption schemes may be used.

BGV Encryption Scheme

Data (m) may be parameterized using the following example quantities:
- security parameter (e.g., root Hermite factor) $\delta$,
- prime ciphertext modulus $q=q(\delta)$,
- ring dimension $n=n(\delta)$,
- cyclotomic polynomial $\Phi_m(x)$ where $n=\phi(m)$ (e.g., Euler's totient function, counting the positive integers less than or equal to m that are relatively prime to m),
- B $(\delta)$—e.g., bounded discrete Gaussian (error) distribution $\chi=\chi(\delta)$ over the polynomial ring $R=Z/\Phi_m(x)$.

For security and implementation reasons, some embodiments of the invention relate to a scenario in which m is a power of 2, i.e., $m=2n$ and $\Phi_m(x)=x^n+1$. Power-of-2 cyclotomic polynomials are also considered. In some embodiments, the plaintext space is $M=\{0,1\}$ and all operations on ciphertexts may be performed in a ring, e.g., $R_q \equiv R/qR$. Each coefficient in the polynomials may be represented in the rang $$\{-\lfloor \tfrac{q}{2} \rfloor, \ldots, \lfloor \tfrac{q}{2} \rfloor\}.$$

The process may include the following example operations:

ParamsGen($\lambda$): Choose positive integers q and n. Return $pp=(q,n)$.

KeyGen(pp,$\lambda$): Sample polynomials $a \leftarrow U_q$ and $s,e \leftarrow \chi_e$. Compute $b:=a \cdot s+pe \in R_q$. Set the public key pk and private key sk:

$sk:=s \in R, pk:=(a,b) \in R_q^2$

Enc(pp, pk=(a,b),m$\in$M): Sample polynomials $v,e_0,e_1 \leftarrow \chi_e$. Compute the ciphertext $c=(c_0, c_1) \in R_q^2$:

$c_0:=bv+pe_0+m \in R, c_1:=av+pe_1 \in R_q$

Dec(pp, sk=s, c): Compute the ciphertext error $t:=c_0-s \cdot c_1 \in R_q$. Output $m':=t \pmod p$.

The scheme is typically correct as long as there is no wrap-around modulo q. Indeed, $$t = b \cdot v + pe_0 + m - sav + pe_1 \cdot = as + pe \cdot v + pe_0 + m - s \cdot av + pe_1$$
$$= m + pev + pe_0 - se_1.$$

where all computations are performed mod q. If the value of t does not wrap around modulo q, then $m'=m+p(ev+pe_0-se_1)=m \pmod p$ To derive the correctness constraint for decryption, the coefficients in s, v, e, $e_0$, $e_1$, generally cannot exceed $B_e$ as these coefficients may be generated by a $B_e$-bounded discrete Gaussian distribution. Assuming that $B_e>1$, produces the following result:

$\|t\|_\infty < 3\sqrt{n}pB_e^2$

To guarantee correct decryption of the cipher text, coefficients in (t) should typically not exceed q/2, leading to the following correctness constraint:

$q<6\sqrt{n}pB_e^2$

BGV Encryption Scheme: Security

The security of the encryption scheme is based on the "Ring Learning With Errors" (RLWE) assumption. Parameters may be set in accordance with the security inequality derived for Ring-LWE, for example:

$$n \geq \frac{\log(q/\sigma)}{4\log(\delta)}.$$

Single Re-Encryption Scheme Based on BGV (BGV-sPRE)

The PRE process based on BGV may use three new operations (in addition to ParamsGen, KeyGen, Enc, and Dec) in contrast to two needed for the PRE process based on LTV. In BGV-PRE, the evaluation key generation may be performed in two separate stages: PublicKeyGen and ReKeyGen. First, the owner of a key s* may generate a set of "public" keys $(\beta_i,\beta_i s^*+pe_i)$ and then sends these keys to a policy authority. After that, the proxy authority may compute $\gamma_i$ to generate the complete re-encryption key. The aforementioned automated (non-interactive) PRE process may then be performed.

The PublicKeyGen process may input a tuple (e.g., (pp, $\lambda$, sk*=s*)) and proceed as follows. For every $i=0,1, \ldots, \lfloor \log_2(q)/r \rfloor$, where r is the key switching window, sample polynomials $\beta_i \leftarrow U_q$ and $e_i \leftarrow \chi_e$ and compute $\theta_i^*=\beta_i s^*+pe^i \in R_q$ and set $pk:=(\beta_i,\theta_i^*)_{i \in \{0,1,\ldots,\lfloor \log_2(q)/r \rfloor\}}.$ The ReKeyGen process may input:

$(pp,sk=s,pk=(\beta_i,\theta_i^*)_{i \in \{0,1,\ldots,\lfloor \log_2(q)/r \rfloor\}})$ and may proceed as follows. For every $i=0,1, \ldots, \lfloor \log_2(q)/r \rfloor$, compute $\gamma_k=\theta_i^*-s \cdot (2^r)^i \in R_q$, and set the re-encryption key $rk:=(\beta_i,\gamma_i^*)_{i \in \{0,1,\ldots,\lfloor \log_2(q)/r \rfloor\}}.$ The algorithm ReEnc may input $(pp,rk=(\beta_i,\gamma i)_{i \in \{0,1,\ldots,\lfloor \log_2(q)/r \rfloor\}},c)$ and proceed as follows. Compute the ciphertext $c'=(c'_0,c'_1)$ using the $2^r$-base decomposition of ciphertext element $c_1$ of original ciphertext $c=(c_0,c_1)$ $$c'_0 = c_0 + \sum_{i=0}^{\lfloor \log_2(q)/r \rfloor} (c_1^{(i)} \cdot \gamma_i), \quad c'_1 = \sum_{i=0}^{\lfloor \log_2(q)/r \rfloor} (c_1^{(i)} \cdot \beta_i),$$

where $c_1^{(i)}:=\{\alpha \cdot v+pc\}_i$ is the $i_{th}$ "digit" of the base-$2^r$ representation of $c_1$ and $$c_1 = \sum_{i=0}^{\lfloor \log_2(q)/r \rfloor} c_1^{(i)} \cdot (2^r)^i.$$

The ciphertext $c'=(c'0,c'1)$ may represent an encryption of m under the new key s*. Indeed, $$c'_0 - s^* c'_1 = c_0 + \sum_{i=0}^{\lfloor \log_2(q)/r \rfloor} (c_1^{(i)} \cdot \gamma_i) - s^* \cdot \sum_{i=0}^{\lfloor \log_2(q)/r \rfloor} (c_1^{(i)} \cdot \beta_i) =$$

$$c_0 + \sum_{i=0}^{\lfloor \log_2(q)/r \rfloor} (c_1^{(i)} \cdot \{\beta_i \cdot s^* + pe_i - s \cdot (2^r)^i\}) - s^* \cdot \sum_{i=0}^{\lfloor \log_2(q)/r \rfloor} (c_1^{(i)} \cdot \beta_i) =$$

$$c_0 - s \cdot c_1 + pE_i,$$

where $E_i = \sum_{i=0}^{\lfloor \log_2(q)/r \rfloor} (c_1^{(i)} - e_i)$.

It can be seen that $$c_0 - s \cdot c_1 + pE_i (\bmod p) = c_0 - s \cdot c_1 (\bmod p) = m (\bmod p).$$

The above analysis implies that the ciphertext noise term grows only by a small additive factor $p\|E_i\|_\infty$ after each re-encryption, $\|E_i\|_\infty$ can be expressed as:

$$\|E_i\|_\infty < \sqrt{n} B_e (2^r - 1)(\lfloor \log_2(q)/r \rfloor + 1). \quad (1)$$

Because ciphertext noise grows minimally after each iteration of re-encryption (e.g., at most as the logarithm of the modulus q), embodiments of the invention support any number of multiple encryptions (e.g., with a below threshold amount of noise).

Multiple Re-Encryption Scheme Based on BGV (BGV-mPRE)

The above re-encryption process can be applied iteratively up to d times for any a priori fixed integer number d (referred to as "d-hop" proxy re-encryption), as long as the growth of error is managed correctly. That is, after each re-encryption process the ciphertext error increases, e.g., in accordance with Equation (1) above. To manage the error growth, a correctness condition may be applied for a d-hop proxy re-encryption.

The correctness constraint for d re-encryption hops may be, for example:

$$q > 2\sqrt{n} p B_e \{3B_e + d \cdot (2^r - 1)(\lfloor \log_2(q)/r \rfloor + 1)\}.$$

Parameter Selection for LTV and BGV PRE

A common issue with lattice-based encryption schemes is that they are typically more complicated to parameterize than other families of encryption schemes. Parameter selection is governed largely by a correctness condition (e.g., which may be specific to the scheme being analyzed) and security conditions for the underlying security assumptions.

For LTV-PRE, parameter selection may be governed by the correctness condition, the security condition accounting for the NTRU immunity against subfield lattice attacks, and/or the RLWE security condition.

For BGV-PRE, parameter selection may be governed by the correctness condition and/or the RLWE security condition.

Embodiments of the invention may balance parameter tradeoffs associated with the correctness constraint and security constraints for both schemes. Of significant importance are the ring dimension n and ciphertext modulus q, both of which are tunable parameters that have a direct impact on the runtimes of the PRE process. The value of n may be kept as small as possible to provide sufficient security, as runtime is typically at least linear in n for all operations. The value of q determines the sizes of integers that need to be manipulated computationally. Ideally q should be kept less than a threshold (e.g., $2^{32}$ or $2^{64}$) so that operations can be performed by native arithmetic operations supported with the processor word sizes in modern processors.

The maximum supported value of d, the number of hops or iterations of multiple re-encryption, may be an application-specific parameter determined by the number of PRE hops needed.

Parameter selection may begin with the security parameter $\delta$, also known as the root Hermite factor. A heuristic argument suggests that a root Hermite factor of $\delta = 1.006$ could provide adequate security. Therefore, the root Hermite factor may be selected to be as close as possible to this maximum, $\delta < 1.006$.

The bound for discrete Gaussian distribution $\chi_i(x)$, where $i \in (k, e)$, may be expressed as $B_i = \sigma_i$, where $\sigma_i$ is the standard deviation of the distribution and $\alpha$ determines the effective probability that a coefficient generated using discrete Gaussian distribution (or a product of discrete Gaussians) exceeds the bound $B_i$.

The value of $\sigma_e$ is usually chosen in the range from e.g., 3 to 6, and the value of $\sigma_e$ may be set e.g., to 4. The value of $\alpha$ may be set e.g., to 9, which for the case of an integer generated using discrete Gaussian distribution corresponds to the theoretic probability of at most $2^{-8}$ of choosing a value that exceeds the upper bound $B_i$.

The above selection of $\sigma_i$ and $\alpha$ was validated experimentally. Over 35,000 iterations of encryption/decryption processes were performed (using different keys) for ring dimensions in the range from $2^9$ to $2^{15}$ (5,000 iterations for each value of ring dimension), and no decryption errors were observed. Note that when products of two discrete Gaussians (encryption scheme), three discrete Gaussians (single-hop re-encryption in the case of LTV-PRE), and higher number of discrete Gaussians (multi-hop re-encryption in the case of LTV-PRE) are considered, the practical probability of decryption errors may decrease dramatically. This implies that smaller practical values of a may be used.

Subsequent to the selections of d, $\delta$, $\sigma_e$, and $\alpha$, the values of n, q, and $\sigma_k$ (e.g., only in the case of LTV-PRE) may be chosen experimentally using appropriate correctness and security constraints to minimize runtime/throughput for various values of the key switching window r and plaintext modulus p.

The tables below illustrate example parameter settings for the LTV-PRE scheme.

TABLE 1

Dependence of minimum bit length of modulus q on ring dimension n for multiple re-encryption hops or depth d at r = 1.

| Ring dimension n | 1024 | 2048 | 4096 | 8192 | 16384 | 32768 |
|---|---|---|---|---|---|---|
| Bit length of q (d = 1) | 30 | 31 | 32 | 33 | 34 | 35 |
| Bit length of q (d = 2) | — | 41 | 43 | 44 | 46 | 47 |
| Bit length of q (d = 3) | — | 51 | 53 | 55 | 57 | 59 |

Tables—illustrate the effect of increasing the key switching window r on the minimum values of ring dimension n and bit length of q.

TABLE 2

Dependence of minimum values of ring dimension n
and bit length of modulus q on key switching window
r for single re-encryption (depth d of unity (1)).

| Key switching window r | 1 | 2 | 4 | 8 | 16 |
|---|---|---|---|---|---|
| Bit length of q | 30 | 31 | 32 | 35 | 43 |
| Ring dimension n | 1024 | 1024 | 1024 | 1024 | 2048 |

TABLE 3

Dependence of minimum values of ring dimension n
and bit length of modulus q on key switching window
r for twice re-encryption (depth d of two).

| Key switching window r | 1 | 2 | 4 | 8 | 16 |
|---|---|---|---|---|---|
| Bit length of q | 41 | 42 | 43 | 46 | 53 |
| Ring dimension n | 2048 | 2048 | 2048 | 2048 | 2048 |

Software Implementation

Software Library Design

Figure 3:
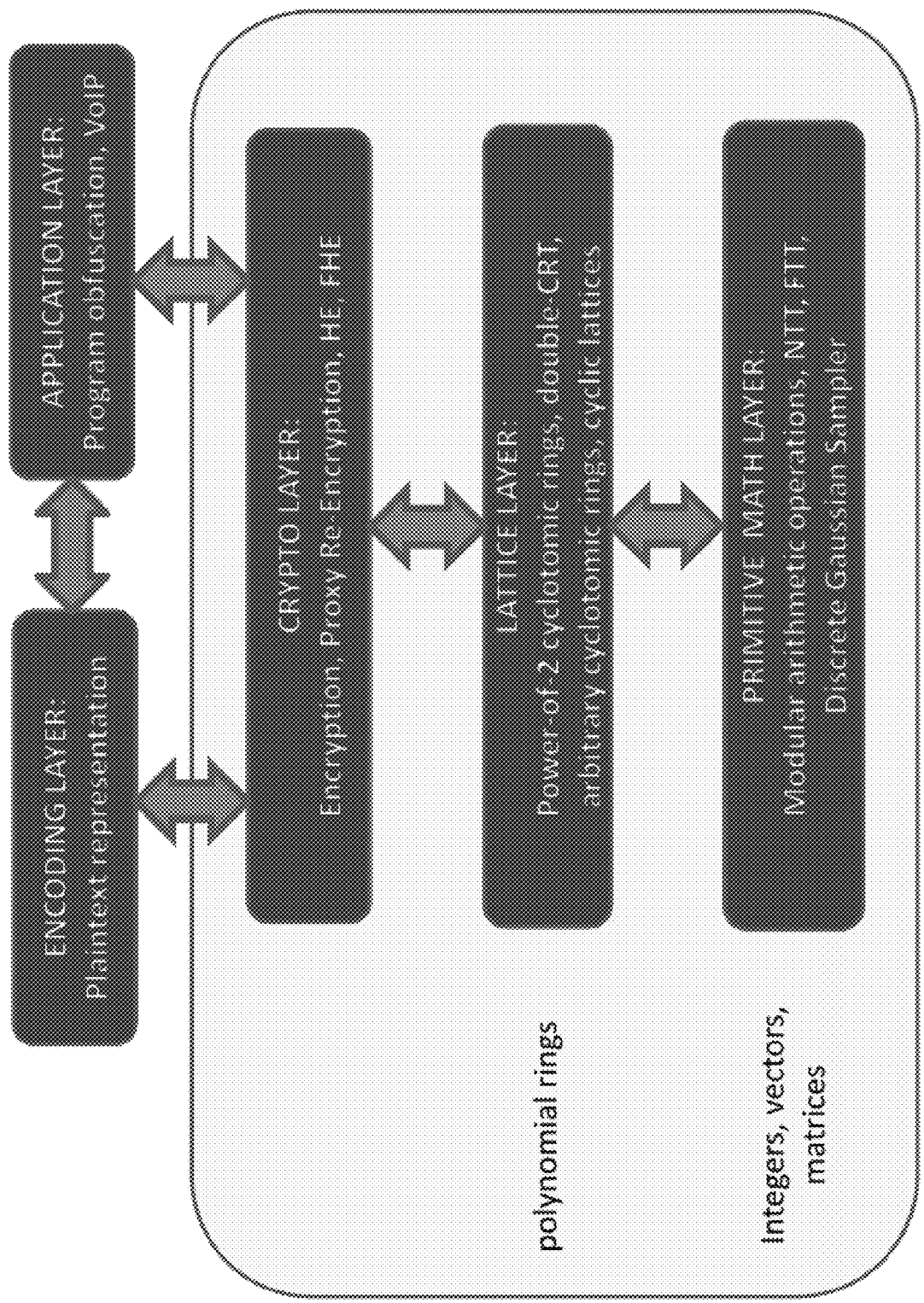
FIG. 3 is a schematic illustration of encryption layers used to implement a PRE scheme in accordance with an embodiment of the invention.

Reference is made to FIG. 3, which schematically illustrates encryption layers used to implement a PRE scheme in accordance with an embodiment of the invention. In one example, the PRE scheme may be implemented as a collection of software classes in PALISADE, a general-purpose portable C++ library designed to support various lattice-based schemes, although other software libraries may be used. The software design in FIG. 3 is modular and includes three major layers: (1) crypto, (2) lattice, and (3) arithmetic (primitive math). Encapsulation, low inter-module coupling, high intra-module cohesion, and maximum code reuse software engineering guidelines are followed when making any library changes.

The crypto layer houses encryption, proxy re-encryption, SHE, and FHE schemes and crypto parameters specific to supported schemes. Currently PALISADE supports the LTV scheme and the BGV scheme as described above. Support for other schemes including scale-invariant LTV may also be used.

The crypto layer communicates directly with lattice constructs, such as power-of-two cyclotomic rings or arbitrary cyclotomic rings, which are defined in the lattice layer. The Double Chinese Remainder Transform (Double-CRT) representation of cyclotomic rings is also implemented in the lattice layer. The library fully supports power-of-two cyclotomic rings (coefficient and CRT representations), but may also support other rings.

Lattice operations are decomposed into primitive arithmetic operations on integers, vectors, and matrices that are implemented in the primitive math layer. Along with basic modular operations, this layer includes efficient algorithms for Number-Theoretic Transform (NTT), Fermat-Theoretic Transform (FTT), and discrete Gaussian samplers. The primitive math layer provides a high level of modularity allowing the library user to integrate PALISADE with an existing low-level library, such as NTL or FFTW, or use a custom hardware-specific implementation, such as FPGA. In this work, a custom implementation of modular arithmetic was used supporting arbitrary-length fixed point integers. The large integers are internally represented as arrays of base-256 (unsigned character) elements enabling the user to run the code on 8-bit, 16-bit, 32-bit, and 64-bit hardware architectures.

Algorithms

One main CPU performance bottleneck of proxy re-encryption, encryption, and decryption operations is the transformation from coefficient representation to the Chinese Remainder Transform (CRT) form and vice versa. For the power-of-two cyclotomic rings, the most efficient algorithm to perform this operation is the Fermat-Theoretic Transform (FTT), which works with the original ring dimension (in contrast to the more general Number-Theoretic Transform (NTT) that typically use an expansion up to the cyclotomic order of the polynomial). A FTT with NTT may be implemented as a subroutine. For NTT, the iterative Cooley-Tukey process with optimized butterfly operations may be applied.

Two of the slowest operations in NTT are multiplication and modulo reduction. For multiplication, the standard shift-and-add multiplication algorithm may be used as it performs well for relatively small bit lengths (e.g., up to 200-300 bits; where the running bit length for the above parameters typically does not exceed 128 bits). For modulo reduction, the generalized Barrett modulo reduction algorithm may be used, which uses one pre-computation per NTT run and converts modulo reduction to roughly two multiplications. For discrete Gaussian sampling, an inversion method proposed by Peikert may be used.

Key Switching Design Optimizations

The conventional key switching procedure works with the key switching window r of unity, implying that every coefficient of the ciphertext polynomial c is decomposed into bits. Although this technique dramatically reduces the noise growth (from $|c|_\infty$ to 1), it significantly increases both computational and space complexities of re-encryption. As there is no efficient method known to extract bits from a polynomial in CRT form, the ciphertext polynomial c may first be converted to the coefficient form, then decomposed into polynomials over $Z_2$, and finally all of these bit-level polynomials may be converted back to CRT form prior to performing the component-wise multiplication with the elements of the evaluation key. The total computational cost of this operation is $\lfloor \log(q) \rfloor + 2$ FTT operations. The size of the evaluation key is approximately $n \cdot \log(q)^2$ bits.

To reduce the number of FTT operations and size of the evaluation key, a generalized key switching window, for example, of up to a threshold such as 16 bits may be used. In the case of r=8, this below threshold key switching window may reduce the number of FTT operations e.g., to $\lfloor \log(q)/8 \rfloor + 2$ and the evaluation key size reduces by a factor of e.g., 8. At the same time, Table 2 suggests that the bit length for q, which is determined by the correctness constraint, increases only by 4 bits compared to the case of r=1 with the minimum ring dimension n staying at the same level. In view of the above, the re-encryption time for this case may be expected to be significantly less than for r=1, which is demonstrated in the next section.

Software Optimizations

The following software optimization techniques may be implemented to achieve improved performance:
  Primitive roots of unity and their inverses may be pre-computed.
  A pool of discrete Gaussian polynomials may be pre-computed and then elements from this pool may be randomly chosen when performing encryption and evaluation key generation operations. To keep the scheme secure, the pool may be periodically regenerated. Private and public key generation operations do not typically use pre-computed discrete Gaussian polynomials and call the sampler directly.

For large integer implementation, an internal memory pool may be implemented to achieve significant execution time improvements, eliminating a large number of expensive new memory allocation operations.

Experimental Evaluation

A set of standard metrics may be used to evaluate the performance of implementations according to some embodiments of the invention. These metrics include, for example:

1. Runtime/Latency: A measure of the duration used to perform the implemented Encryption, Re-Encryption and Decryption operations for various parameter settings.
2. Throughput: A measure of a number of plaintext bits can be processed by the implemented operations for various settings.
3. Cipihertext Expansion: A measure of a number of bits are used to represent ciphertext for every bit in the plaintext.
4. Memory Usage: A measure of an amount of memory is used to run the implemented operations for various settings.

Runtime/Latency measures the amount of time that elapses from that start of an operation to its completion. Latency may be used to determine the temporal overhead of the implementation, which may be useful, for example, when assessing fitness for real-time applications when end-to-end latency is critical, such as for Voice-over-IP (VoIP) systems.

Because each ciphertext may represent the encryption of multiple plaintext bits, the Throughput metric may be used to assess an amount of plaintext data that can be processed by the implementation per unit time. Throughput and runtime also relate to ciphertext expansion. PRE schemes with fast runtimes but low throughout and poor ciphertext expansion may be used for applications with real-time performance requirements. Similarly, PRE schemes with slower runtimes but high throughout and low ciphertext expansion may be used in resource-limited applications without real-time constraints.

Memory Usage: Highly memory efficient implementations are often needed in resource-constrained devices, such as embedded systems.

Metric assessments may depend on the amount of available resources (e.g., memory, CPU speed, number of cores). Experiments were conducted on a commodity desktop computing with an Intel Core i7-3770 CPU with 4 physical cores rated at 3.40 GHz and 16 GB of memory. (All of the tested implementations were single-threaded and used only 1 core, although multiple cores may be used.)

The results of the experiments to evaluate execution runtimes for encryption, decryption, and re-encryption operations at different values of key switching window r and $\delta \leq 1.006$ are shown in Table 4. The results of the experiments to evaluate throughput for encryption, decryption, and re-encryption operations at different values of key switching window r and $\delta \leq 1.006$ are shown in Table 5.

TABLE 4

Execution times for encryption, decryption, and re-encryption operations at different values of key switching window r.

| R | n | Bits in q | Enc (ms) | Dec (ms) | ReEnc (ms) |
|---|---|---|---|---|---|
| 1 | 1024 | 34 | 5.6 | 7.0 | 188 |
| 2 | 1024 | 35 | 5.7 | 7.2 | 107 |
| 4 | 1024 | 36 | 5.8 | 7.4 | 63 |
| 8 | 1024 | 38 | 6.1 | 7.9 | 40 |
| 16 | 2048 | 46 | 14.7 | 19.9 | 70 |

TABLE 5

Throughputs for encryption, decryption, and re-encryption operations at different values of key switching window r.

| r | n | Bits in q | Enc (Kbit/s) | Dec (Kbit/s) | ReEnc (Kbit/s) |
|---|---|---|---|---|---|
| 1 | 1024 | 34 | 178.6 | 142.9 | 5.3 |
| 2 | 1024 | 35 | 175.4 | 138.9 | 9.3 |
| 4 | 1024 | 36 | 172.4 | 135.1 | 15.9 |
| 8 | 1024 | 38 | 163.9 | 126.6 | 25.0 |
| 16 | 2048 | 46 | 136.1 | 100.5 | 28.6 |

Application

Irrespective of regulation, medical data security, especially data from wearable devices, is a pressing concern. Wearable medical devices collect sensitive data about patients' health, day-to-day, often with information about the patients' physical location and well-being. The data is often collected in a different location from where it is stored and the storage location is often different from where health care providers will interpret the results of processing. These data collection, storage and interpretation steps often occur over different time scales with data sometimes being collected every few minutes or even few seconds in the case of detecting life-threatening emergency alerts. Conversely, wearable medical devices may collect information over days or weeks that is used for diagnostic purposes, for example, to decide on courses of treatment.

The pressing security concerns of wearable medical devices, coupled with geographically and temporally distributed data lifecycles, create challenges in creating effective but secure and lower-cost information architectures that can be effectively addressed with PRE techniques. Embodiments of the invention provide an application of the PRE design and library to support the needs of sharing data from wearable medical devices. This approach improves upon current solutions which protect data at times using encryption technologies when data is in motion (when transmitted between storage points) or at rest (when stored). This means that medical data processing could, until now, only be done in trusted computing environments which are often expensive to set up and maintain because they need to be exclusively managed by highly trusted individuals, often in dedicated facilities. Similarly, because encryption was previously only used to protect data when transmitted point-to-point, data was encrypted only when the intended recipient of the data has been pre-approved. Security and effectiveness trade-offs have prevented the wide-spread use of low-cost cloud computing environments and large engineering effort has been needed to validate the security of wearable medical devices that more easily integrate with a larger security ecosystems. All of these concerns can be substantially addressed using PRE and hence reduce the cost of treatment and improve patients' quality of life.

Figure 4:
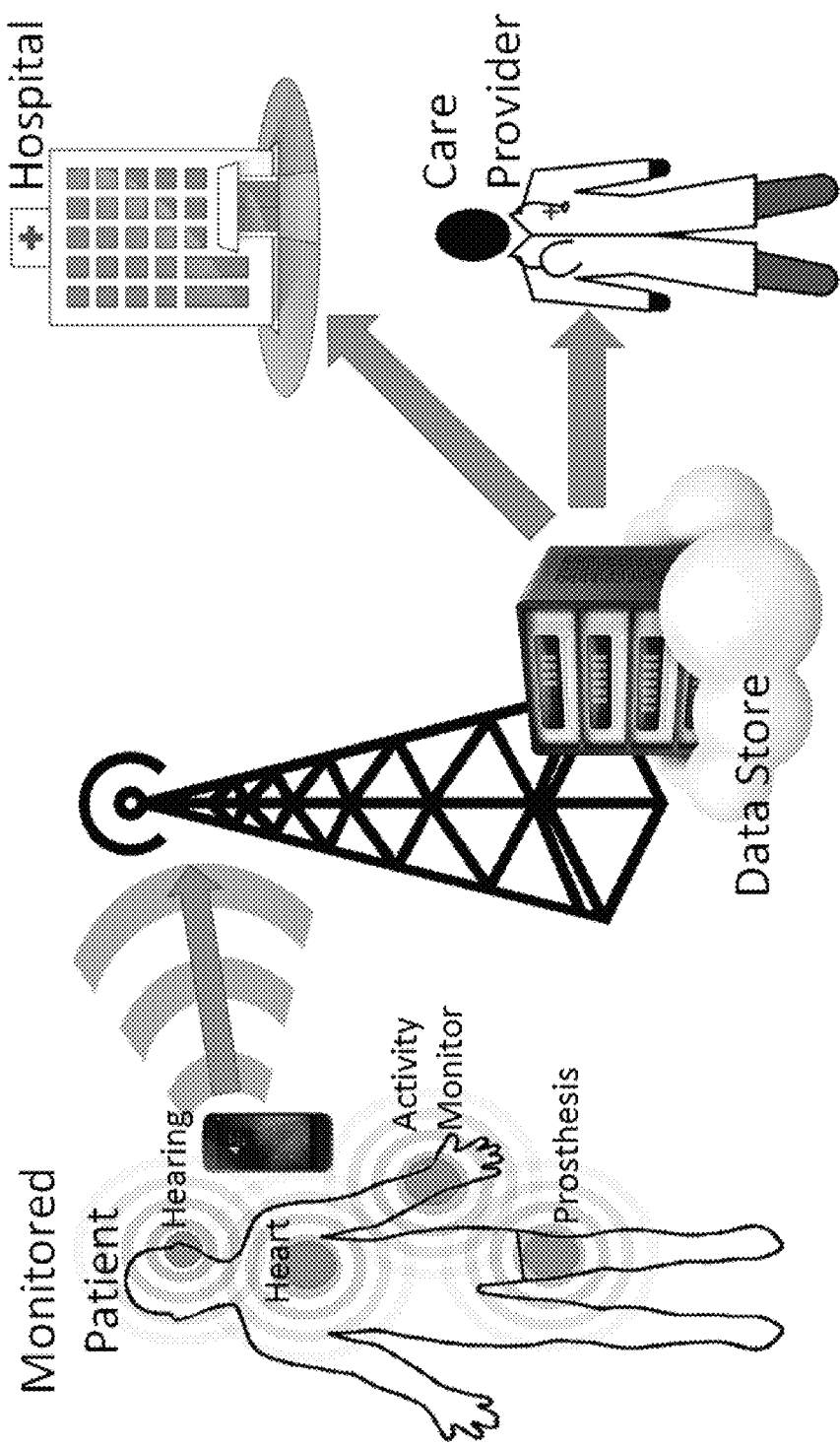
FIG. 4 is a schematic illustration of an overview of a use of the PRE cryptosystem for medical applications in accordance with an embodiment of the invention.

Reference is made to FIG. 4, which schematically illustrates an overview of a use of the PRE cryptosystem for medical applications in accordance with an embodiment of the invention. In FIG. 4, multiple wearable medical devices with body sensors encrypt and send their measured biological data to a network access point (e.g., shown in FIG. 4 as a smart phone with data capability). The sensors could be any number of devices such as heart rate monitors, smart prosthesis diagnostics, hearing aids, etc., where data needs to be collected and transmitted either periodically or in an event-driven manner. The smart phone access point aggregates data from multiple sensors as needed to save on bandwidth, and then transmits the data on commodity data networks to a secure data store which hosts the collected (and encrypted) data. The data store then re-encrypts and forwards the re-encrypted data to approved health care providers.

A more expansive security architecture may be instantiated as a kind of middleware, with adaptability in terms of underlying communication protocols and upper-layer applications that need to manipulate the data built around this PRE capability. However, a simulated network and laboratory prototype has been developed to demonstrate an application proof-of-concept. A datastore may be any server that could reside, for example, in a proprietary data-center or in a cloud computing environment.

To set up the environment, point-to-point communication approvals may be established, such that, for example:
The sensor devices have appropriate encryption keys.
The sensor devices may be paired with the smart phone.
The access point (smart phone) may be configured with the (URL or IP) address of the data store.
The approval for care providers to receive data may be received from the patient or the patient's legally approved representative with the respective re-encryption keys to forward data from sensors to approved recipients.

PRE provides end-to-end lattice encryption to form a basis of security that addresses the above measures to encrypt data at the sensors, transmit the data (e.g., to a cloud storage environment) for processing, and to share the encrypted results with intended recipients, without ever decrypted the data or sharing decryption keys. Current information architectures do not provide end-to-end encryption capabilities, thus creating vulnerabilities such as to insider attacks and creating an inability to lower costs by out-sourcing computing to commodity cloud computing environments.

Within the framework of standard information security analysis approaches, systems are generally analyzed from the perspective of the Confidentiality, Integrity and Availability (CIA) triad. A PRE-based application according to embodiments of the invention addresses vulnerabilities from the Confidentiality perspective, by enabling the data store to 1) process data without access to the unencrypted data or decryption keys and 2) grant access to the encrypted data without the data store being able to grant access to itself. Embodiments of the invention address these issues through a proposed architecture that incorporates an end-to-end encryption capability where embedded medical devices encrypt data at the sensor, and data is never unencrypted until it reaches its intended recipient. As such, the architecture addresses important data leakage threats to address key security concerns.

Because some embodiments of the invention use a public key encryption scheme, the (e.g., smart phone) access point may be assigned a public key by the patient or even the patient's primary care provider. The access point may assign this public encryption key to the wearable medical devices to use for encrypting data.

Experimental results indicate that the re-encryption process, using current designs and implementations runs in milliseconds. A scenario was tested in which the patient, cloud store and doctor are all in different geographic locations, in particular, with a patient in New Jersey, USA, a cloud store in Virginia, USA and a recipient in a different New Jersey city. Transmission latency from patient to store was 12 ms, and from store to recipient was another 12 ms. As such, adding security via PRE to a medical data distribution framework does not drastically impact the end-to-end latency, for example, increasing latency by less than an order of magnitude, and providing an additional total end-to-end latency of less than a second, indicate the practical feasibility of these approaches.

Design Considerations

PRE has been shown to be secure under a standard hardness assumption called the decisional bilinear Diffie-Hellman (DBDH) assumption. At a very high level, this result means that PRE messages are at least as hard to crack in a brute-force manner as a well-known difficult computation problem.

There are multiple identified approaches to design a system that supports the re-encryption functionality. Prior to PRE, the primary approach used for re-encryption relies on a trusted apparatus (or "proxy") that decrypts input ciphertexts using the publisher's secret key and encrypts the resulting messages under the subscriber's public key. Unfortunately this solution is not ideal because it would require storing the publisher's secret key, which makes it an appealing target to adversaries and it would have to be hardened properly.

The PRE cryptosystem described herein allows for a secure transformation of ciphertexts. The publisher (or a trusted third party not directly involved in tactical operations that handles key management) creates a "translation" or re-encryption key. This re-encryption key is computed from the publisher's secret key and the subscriber's public key. The PRE server uses the re-encryption key to convert messages encrypted with the publisher's public key so they can be decrypted using the subscriber's secret key. Anyone who obtains possession of the re-encryption key (such as any adversary with full access to the PRE server due to compromise or capture) is not able to access any encrypted data. Further, the re-encryption key can only be used for translations and, in particular, it does not reveal the publisher's or the subscriber's secret key. Thus, the PRE server would be of no use to any adversary that captures it or manipulates its manufacturing process with compromised circuitry.

These proxy re-encryption schemes are non-interactive and unidirectional. This means that receivers such as the subscribers are not involved during the generation of the re-encryption key which allows ciphertext translation from the publisher to the subscriber but not vice versa.

Although embodiments of the invention are described for situations with one producer (e.g., the publisher) and one consumer (e.g., the subscriber), there is no theoretical limit to the number of producers and subscribers that can be used for PRE operations. PRE can support general many-to-many secure information sharing operations, but there may be a practical limit imposed by the throughput of the PRE server. PRE may be implemented using general many-to-many operations where data from many producers is securely shared with many consumers through the PRE prototype, by generating multiple re-encryption keys, one for every permitted publisher-subscriber information sharing pair. Embodiments of the invention include variations of the PRE concept that address this potential concern.

A possible approach to address scalability is to distribute the operations of the PRE servers across many computation nodes. While this discussion focuses on single-server operations, it may be evaluated whether this simpler and more economical single PRE server architecture is sufficient in practice, for example, for medical or military operations, and it may be identify how and when it makes sense to provide higher-performance, distributed PRE servers in a follow-on activity.

Highly dynamic interactions involving pub-sub interactions in tactical domains are difficult to secure with current deployed technologies due to their highly dynamic and group-based interaction models. Current standardized technologies, such as HAIPE radios and SELinux policies, can be applied to provide proven network protections and fine-grained mandatory access control policies for applications. However, these technologies still require trust in information brokers to a) perform correct subscription matching, b) not corrupt mission sensitive information, and c) not disclose mission sensitive information in unauthorized ways. The current state of the art in pub-sub based dissemination of sensitive information requires either 1) the use of HAIPE to provide network protection, with the cumbersome and expensive dedication of trusted resources to securely host encryption keys and encryption/decryption operations at the brokering service with sensitive content unencrypted at the broker or 2) human-in-the-loop filtering and physically bridging two networks that have air-gaps between them. As a consequence, humans are often required to filter information that is shared or an all or nothing approach is taken. This human-in-the-loop solution is too expensive and does not scale. This leads to undue expense both in terms of extra hardware and manpower, and reduced capability of coalition forces stemming from walled off information domains. When mission needs override security concerns, information could be sent in the clear (e.g., over an unencrypted voice channel), leading to decreases in operational security.

Discussion and Ongoing Activities

Embodiments of the invention provide a new improved secure lattice-base PRE scheme. Embodiments of the invention were tested using a modular C++ lattice encryption library and were experimentally evaluated. In general, the PRE cryptosystem described herein, when run on commodity computing devices, runs multiple orders of magnitudes faster than prior PRE scheme implementations.

A major benefit of this end-to-end encryption approach to provide confidentiality is that this scheme can be securely run on commodity cloud computing environments, and also greatly reduce the incidence of pernicious insider attacks. For example, even with encrypted computing hosted on proprietary servers, the encryption technologies limit the users who have access to the data to only the system administrators who have decryption key access. Taken together, this could greatly reduce the operational costs of highly regulated industries such as health-care or military where regulatory compliance restricts the ability to outsource computation to low cost cloud computing environments.

The application of the PRE cryptosystem to the domain of end-to-end security for wearable medical devices has the possibility to support more secure medical device data distribution while also being practical for life-critical use cases where low end-to-end latency is needed.

Performance advances of the PRE cryptosystem come from an improved design of lattice encryption primitives, tighter parameter selection with more accurate lower-bounds on the level of security provided, and possibly more efficient implementation (e.g., reduced computational load for a higher level of security). The lattice encryption library is an important aspect of the design in that its modularity and extensibility enables further improvement with increased performance with either improved mathematical libraries or even hardware acceleration. It may also be feasible to rely on commodity FPGAs and GPUs operating as "co-processors" to improve performance. If ported to a dedicated FPGA co-processor, the runtime of the underlying PRE implementation may be greatly improved as compared to the runtime of a corresponding interpreted CPU-only implementation. Also, the bit decomposition method can be parallelized for faster execution and increased speed. For example, each dimensional portion i of the base decomposition may be executed in parallel or in series.

Embodiments of the invention may be further augmented to provide important Integrity and Availability protections which form the other two legs of the CIA triad. For example, broad use of legacy cryptographic signing methods would bolster integrity and service replication would also bolster availability against denial-of-service attacks, for example. In addition, PRE hosts can be readily augmented or replicated to improve resistance against other attacks such as Denial-Of-Service (DOS) and spoofing attacks. The PRE architecture is compatible with current industry standard technologies such as digital signatures and replication strategies that can be used with PRE to protect against additional attacks.

Based on these advances, additional research is in "systems" aspects of scalable secure computing that are enabled by this approach include increasing scale through distributed re-encryption. Distributed proxy re-encryption is feasible to provide higher performance secure information sharing at faster computational speeds. However, by distributing re-encryption, operations require more coordination bandwidth, more complicated key management, and additional overhead associated with the distribution of re-encryption operations. However, to go beyond localized secure information sharing to operate on very wide scales using relatively inexpensive commodity computing hardware, distributed re-encryption may be used.

Embodiments of the invention may include the ability of secure computing to allow filtering based on encrypted data. One major problem with proxy re-encryption is that it makes security filtering on the payload difficult or impossible, since the broker no longer has access to encrypted content. New approaches are needed that enable brokering based on encrypted data. Recent breakthroughs in practical homomorphic computing show this is possible, but there is a need for developments that can leverage these breakthroughs for applications. Fortunately, the lattice-based approach of this PRE scheme is compatible with homomorphic encryption methods. For instance, output of the encryption operation can be bootstrapped into larger ciphertext which can support arbitrary-depth computation without requiring decryption or secret key sharing.

Flowchart

Figure 5:
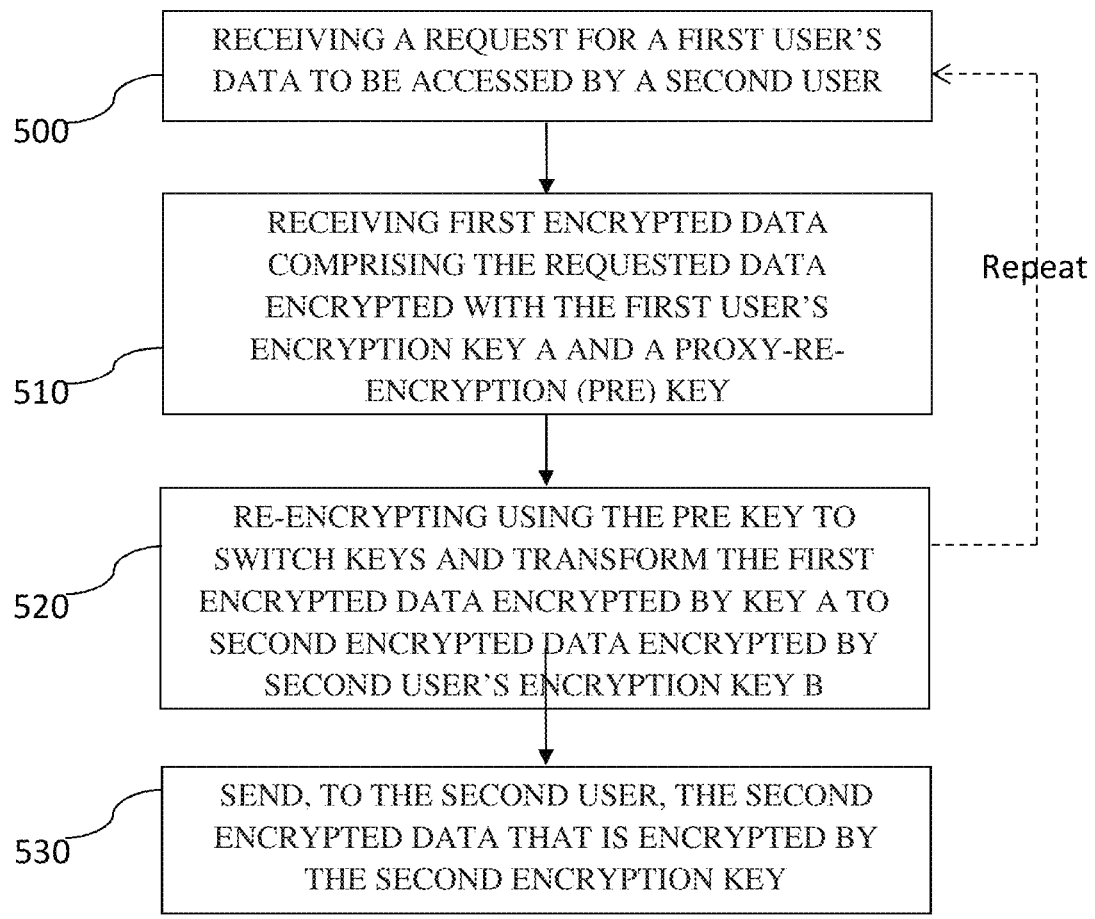
FIG. 5 is a flowchart of one or more methods for proxy re-encryption (PRE) in accordance with some embodiments of the invention.

Reference is made to FIG. 5, which is a flowchart of one or more methods for proxy re-encryption (PRE) using key switching or multi-layered encryption in accordance with some embodiments of the invention. The method(s) of FIG. 5 may be performed using devices or components disclosed in reference to the systems of FIGS. 1A, 2A, 2B, using the data structures disclosed in reference to FIG. 1B. For example, the method(s) of FIG. 5 may be performed using one or more processors 146 of first user device 140 of FIG. 1A or one or more processors 116 of proxy server 110 of FIG. 1A or proxy server and/or policy authority of FIGS. 2A and 2B. Other devices or systems may also be used.

In FIG. 5, a first user may be assigned a pair of a first (e.g., public) encryption key and a corresponding first (e.g., private) decryption key and a second user may be assigned a pair of a second (e.g., public) encryption key and a corresponding second (e.g., private) decryption key (e.g., self-assigned or assigned by another party as shown in FIG. 2A and/or assigned by a policy authority as shown in FIG. 2B). The first encrypted data is decryptable only by the first encryption key (but not the second encryption key) stored only by the first user (e.g., in memory 148 of the first user device 140 of FIG. 1A) (hut not the second user or proxy server), and the second encrypted data is decryptable only by the second encryption key (but not the first encryption key) stored only by the second user (e.g., in memory 158 of the second user device 150 of FIG. 1A) (but not the first user or proxy server). The proxy server cannot decrypt the first or second encrypted data.

In operation 500, one or more processors (e.g., 116 of FIG. 1A) may receive (e.g., from the second user) a request for the first user's data (e.g., publisher user A's data) to be accessed by the second user (e.g., subscriber user B).

In operation 510, one or more processors (e.g., 116 of FIG. 1A) may receive (e.g., from the first user) first encrypted (or once-encrypted encrypted) data (e.g., 160 of FIG. 1B) comprising the requested data encrypted with the first encryption key and a proxy re-encryption key (or multi-layered re-encryption key) (e.g., 162 of FIG. 1B) generated based on a combination of the first decryption key and the second encryption key. These data may be stored in one or more memories (e.g., 115 or 118 of FIG. 1A). The first encrypted data and the proxy re-encryption key may be generated by one or more processors (e.g., 146 of the first user device 140 of FIG. 1A).

In operation 520, one or more processors (e.g., 116 of FIG. 1A) may re-encrypt the first encrypted data using a proxy re-encryption key (e.g., 162 of FIG. 1B) to simultaneously switch encryption keys by adding the second encryption key and cancelling the first encryption key (by the first decryption key) to transform the first encrypted data that is encrypted by the first encryption key to second encrypted (or twice-encrypted) data (e.g., 168 of FIG. 1B) that is encrypted by the second encryption key, without decrypting the request data. The first and second keys may be switched simultaneously by executing a single encryption operation applying a single instance of the proxy re-encryption key to the first encrypted data.

One or more processors (e.g., 116 of FIG. 1A) may re-encrypt the first encrypted (or once-encrypted) data (e.g., 160 of FIG. 1B) using a second encryption key to generate twice-encrypted data (e.g., 164 of FIG. 1B) that is encrypted by the first and second encryption keys by the first and second encryption keys. One or more processors may encrypt the first encryption key by the second encryption key to generate a multi-layered re-encryption key (e.g., 162 of FIG. 1B). Under a common encryption layer of the second encryption key (e.g., in combined data structure 166 of FIG. 1B), one or more processors may decrypt the twice-encrypted data using the multi-layered re-encryption key to cancel the first encryption key while leaving the second encryption key to generate second encrypted data (e.g., 168 of FIG. 1B) comprising the data encrypted by only the second encryption key.

One or more processors (e.g., 146 of FIG. 1A) may generate the proxy re-encryption key based on a combination of the first decryption key assigned to the first user and the second encryption key assigned to the second user. One or more processors may generate the proxy re-encryption key based on a private first decryption key and a public second encryption key. One or more processors may generate the proxy re-encryption key based on the first decryption key of the first user, encrypted by a noisy version of the second encryption key of the second user. One or more processors may generate the noisy version of the public second encryption key by modifying the public second encryption key with random data generated by a random number generator.

One or more processors (e.g., 116 of FIG. 1A) may re-encrypt the first encrypted data with the proxy re-encryption key in a space of finite modulus (e.g., q) such that re-encrypted terms based on the first encryption key cancel in the space and re-encrypted terms based on the second encryption key add in the space.

One or more processors (e.g., 116 of FIG. 1A) may re-encrypt the first encrypted data with the proxy re-encryption key using a bit-wise or dimensional decomposition. One or more processors may decompose the first encrypted data into a plurality of dimensional portions, independently re-encrypt each dimensional portion of the first encrypted data using the proxy re-encryption key, and compose the independently re-encrypted dimensional portions to generate the second encrypted data. The first encrypted data may be decomposed into powers of $2^r$, such that each dimensional portion may represent a value of the first encrypted data for a different power of $2^r$. In some embodiments, multiple processors may re-encrypt multiple respective dimensional portions of the first encrypted data in parallel.

One or more processors (e.g., 116 of FIG. 1A) may optionally repeat operations 500-520 multiple times. In each iteration, one or more processors may apply an additional re-encryption procedure, for example, switching data from being encrypted by key A to key B (first iteration), then from key B to key C (second iteration), then from key C to key D (third iteration), and so on. The data may be re-encrypted any number of times.

In operation 530, one or more processors (e.g., 116 of FIG. 1A) may output, display and/or send, to the second user (e.g., second user computer 150 of FIG. 1A), the second encrypted data that is encrypted by the second encryption key, for example, to fulfill the data access request. One or more processors (e.g., 156 of second user computer 150 of FIG. 1A) may decrypt the second encrypted data, for example, in a space of finite modulus such that noisy terms cancel. No other processors (e.g., neither processors 116 nor 146 of FIG. 1A) may be able to decrypt the second encrypted data with their first encryption key and PRE key, respectively. Only the second user device (e.g., 150 of FIG. 1A) may decrypt the second encrypted data with its second encryption key.

CONCLUSION

It should be recognized that embodiments of the present invention may solve one or more of the objectives and/or challenges described in the background, and that embodiments of the invention need not meet every one of the above objectives and/or challenges to come within the scope of the present invention. While certain features of the invention have been particularly illustrated and described herein, many modifications, substitutions, changes, and equivalents may occur to those of ordinary skill in the art. It is, therefore, to be understood that the appended claims are intended to cover all such modifications and changes in form and details as fall within the true spirit of the invention.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined. The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method of Ring Learning with Errors (R E) proxy re-encryption using key switching, the method comprising:
    receiving a request for a first user's data to be accessed by a second user, wherein the first user is assigned a first encryption key and a corresponding first decryption key and the second user is assigned a second encryption key and a corresponding second decryption key;
    receiving, from the first user, first encrypted data comprising the requested data once-encrypted by the first encryption key and a Ring Learning with Errors (RLWE) multi-layered proxy re-encryption key generated based on a combination of the first decryption key and the second encryption key in an N-th degree truncated polynomial ring in a lattice;
    re-encrypting the first encrypted data using the second encryption key to generate twice-encrypted data that is encrypted by the first and second encryption keys;
    decrypting the twice-encrypted data using the RLWE multi-layered proxy re-encryption key to simultaneously switch encryption keys by leaving the second encryption key and cancelling the first encryption key by the first decryption key to transform the first encrypted data that is encrypted by the first encryption key to second encrypted data that is encrypted by the second encryption key, without decrypting the request data; and
    sending, to the second user, the second encrypted data that is encrypted by only the second encryption key.

2. The method of claim 1, wherein the RLWE proxy re-encryption key is generated based on the first decryption key assigned to the first user, encrypted by the second encryption key assigned to the second user.

3. The method of claim 1 comprising re-encrypting the first encrypted data with the RLWE proxy re-encryption key in a space of finite modulus, wherein re-encrypted data based on the first decryption key cancel in the space and re-encrypted data based on the second encryption key add in the space.

4. The method of claim 1 comprising the second user decrypting the second encrypted data in a space of finite modulus to cancel noise.

5. The method of claim 1 comprising:
    decomposing the first encrypted data into a plurality of dimensional portions;
    independently re-encrypting each dimensional portion of the first encrypted data using the RLWE proxy re-encryption key; and
    composing the independently re-encrypted dimensional portions to generate the second encrypted data.

6. The method of claim 5, wherein each dimensional portion represents a value of the first encrypted data for a different power of $2^r$.

7. The method of claim 1, wherein the first encrypted data is decryptable only by the first decryption key but not a second decryption key corresponding to the second encryption key, and the second encrypted data is decryptable only by the second decryption key but not the first decryption key.

8. The method of claim 1, wherein the first decryption key and the second encryption key are switched simultaneously by executing a single encryption operation applying a single instance of the RLWE proxy re-encryption key to the first encrypted data.

9. The method of claim 1 comprising re-encrypting the first encrypted data a plurality of times.

10. A system for Ring Learning with Errors (RLWE) proxy re-encryption using key switching, the system comprising:
a memory to store a first encryption key assigned to a first user, a second encryption key assigned to a second user, and first encrypted data comprising the first user's data once-encrypted by the first encryption key; and
one or more processor(s) to:
re-encrypt the first encrypted data using the second encryption key to generate twice-encrypted data that is encrypted by the first and second encryption keys,
decrypt the twice-encrypted data using a Ring Learning with Errors (RLWE) multi-layered proxy re-encryption key to simultaneously switch encryption keys by leaving the second encryption key and cancelling the first encryption key to transform the first encrypted data that is encrypted by the first encryption key to second encrypted data that is encrypted by the second encryption key, without decrypting the request data, wherein the RLWE multi-layered proxy re-encryption key is generated based on a combination of a first decryption key corresponding to the first encryption key and the second encryption key in an N-th degree truncated polynomial ring in a lattice, and
output the second encrypted data that is encrypted by only the second encryption key.

11. The system of claim 10, wherein the processor is to generate the RLWE proxy re-encryption key based on the first decryption key assigned to the first user, encrypted by the second encryption key assigned to the second user.

12. The system of claim 10, wherein the processor is to generate the RLWE proxy re-encryption key based on the private first decryption key of the first user, encrypted based on a noisy version of the public second encryption key of the second user.

13. The system of claim 10, wherein the processor is to re-encrypt the first encrypted data with the RLWE proxy re-encryption key in a space of finite modulus, wherein re-encrypted data based on the first encryption key cancel in the space and re-encrypted data based on the second encryption key add in the space.

14. The system of claim 10 comprising a device assigned to the second user comprising one or more processors to decrypt the second encrypted data using a second decryption key corresponding to the second encryption key in a space of finite modulus to cancel noise.

15. The system of claim 10, wherein the processor is to:
decompose the first encrypted data into a plurality of dimensional portions;
independently re-encrypt each dimensional portion of the first encrypted data using the RLWE proxy re-encryption key; and
compose the independently re-encrypted dimensional portions to generate the second encrypted data.

16. The system of claim 15 comprising multiple processors to re-encrypt multiple respective dimensional portions of the plurality of dimensional portions in parallel.

\* \* \* \* \*